US010195911B2

(12) United States Patent
Aoki et al.

(10) Patent No.: US 10,195,911 B2
(45) Date of Patent: Feb. 5, 2019

(54) PNEUMATIC TIRE HAVING BEAD CORE WITH STRETCHABLE PORTION

(71) Applicant: SUMITOMO RUBBER INDUSTRIES, LTD., Kobe-shi, Hyogo (JP)

(72) Inventors: Chieko Aoki, Kobe (JP); Toru Fukumoto, Kobe (JP); Tadao Matsumoto, Kobe (JP)

(73) Assignee: SUMITOMO RUBBER INDUSTRIES, LTD., Kobi-shi (JP)

( * ) Notice: Subject to any disclaimer, the term of this patent is extended or adjusted under 35 U.S.C. 154(b) by 253 days.

(21) Appl. No.: 15/034,627

(22) PCT Filed: Oct. 24, 2014

(86) PCT No.: PCT/JP2014/078292
§ 371 (c)(1),
(2) Date: May 5, 2016

(87) PCT Pub. No.: WO2015/072307
PCT Pub. Date: May 21, 2015

(65) Prior Publication Data
US 2016/0272013 A1   Sep. 22, 2016

(30) Foreign Application Priority Data
Nov. 13, 2013   (JP) .................................. 2013-234559

(51) Int. Cl.
*B60C 15/04*   (2006.01)
*B60C 9/00*   (2006.01)
(Continued)

(52) U.S. Cl.
CPC ................ *B60C 15/04* (2013.01); *B60C 9/00* (2013.01); *B60C 9/02* (2013.01); *B60C 15/02* (2013.01);
(Continued)

(58) Field of Classification Search
CPC ..... B60C 15/00; B60C 15/04; B60C 15/0603; B60C 2001/0058; B60C 2015/042;
(Continued)

(56) References Cited

U.S. PATENT DOCUMENTS 2,874,747 A   2/1959   Woodall
3,942,574 A   3/1976   Bantz
(Continued)

FOREIGN PATENT DOCUMENTS

JP   51-83302 A   7/1976
JP   63-61611 A   3/1988
(Continued)

OTHER PUBLICATIONS

International Preliminary Report on Patentability and an English translation of the Wirtten Opinion of the International Searching Authoirity (Forms PCT/IB/373 and PCT/ISA/237), dated May 17, 2016, for International Application PCT/JP2014/078292.
(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

A pneumatic tire 22 includes a pair of beads 30 and a carcass 32 extending on and between both beads 30. Each bead 30 includes a core 48. The core 48 includes: a main body 56 including a cord 60 extending in a circumferential direction; and a stretchable portion 58 formed from a crosslinked rubber. The stretchable portion 58 is located inward of the main body 56 in an axial direction. The stretchable portion 58 has a size with which at least one cross-section of the cord 60 can be included therein in a cross-section of the bead 30. Preferably, in the tire 22, the main body 56 includes a hard unit and a soft unit. The soft unit is located outward of the
(Continued)

hard unit in a radial direction. A hard cord of the hard unit stretches more easily than a soft cord of the soft unit.

2 Claims, 17 Drawing Sheets

(51) Int. Cl.
| | |
|---|---|
| *D07B 1/06* | (2006.01) |
| *B60C 9/02* | (2006.01) |
| *B60C 15/02* | (2006.01) |
| *B60C 15/06* | (2006.01) |
| *D02G 3/48* | (2006.01) |
| *B60C 17/00* | (2006.01) |

(52) U.S. Cl.
CPC ........... *B60C 15/0603* (2013.01); *D02G 3/48* (2013.01); *D07B 1/0613* (2013.01); *D07B 1/0646* (2013.01); *B60C 17/0009* (2013.01); *B60C 2015/042* (2013.01); *B60C 2015/046* (2013.01); *D07B 2201/1016* (2013.01); *D07B 2201/1092* (2013.01); *D07B 2201/2006* (2013.01); *D07B 2401/2005* (2013.01); *D07B 2501/2053* (2013.01)

(58) Field of Classification Search
CPC ........ B60C 2015/046; B60C 2015/048; B60C 17/08; B29D 30/48; B29D 2030/481–2030/488; Y10T 152/10819; D02G 3/48; D07B 2201/1016; D07B 2501/2046

USPC ......................... 152/539, 540, 547, 451, 556
See application file for complete search history.

(56) References Cited

U.S. PATENT DOCUMENTS

| | | | |
|---|---|---|---|
| 5,307,853 A | * | 5/1994 | Okuda .................... B60C 15/04 152/540 |
| 6,422,280 B1 | | 7/2002 | Thomas |
| 6,447,905 B1 | * | 9/2002 | Hu ............................ B60C 1/00 152/391 |
| 2013/0186542 A1 | | 7/2013 | Aoki |

FOREIGN PATENT DOCUMENTS

| | | |
|---|---|---|
| JP | 2-175401 A | 7/1990 |
| JP | 7-96720 A | 4/1995 |
| JP | 9-188105 A | 7/1997 |
| JP | 2001-55021 A | 2/2001 |
| JP | 2001-71718 A | 3/2001 |
| JP | 2002-36830 A | 2/2002 |
| JP | 2004-82767 A | 3/2004 |
| JP | 2005-335584 A | 12/2005 |
| JP | 2010-274858 A | 12/2010 |
| JP | 2013-56566 A | 3/2013 |

OTHER PUBLICATIONS

International Search Report for PCT/JP2014/078292 dated Jan. 27, 2015.
Written Opinion of the International Searching Authority for PCT/JP2014/078292 dated Jan. 27, 2015.

* cited by examiner

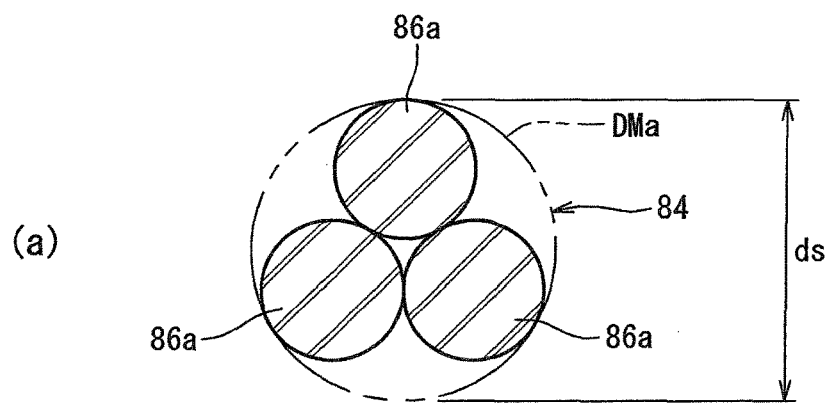
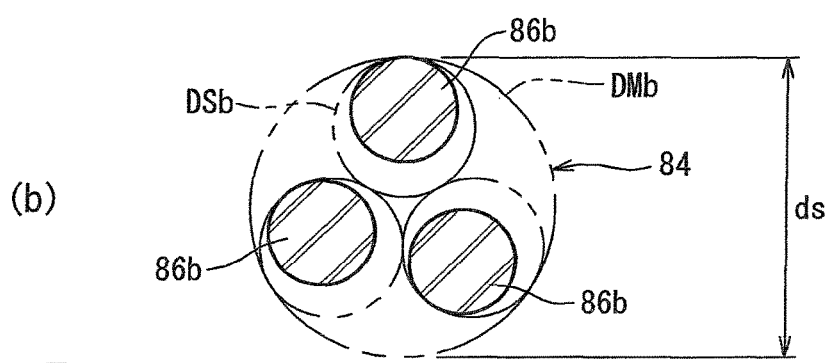
FIG. 5
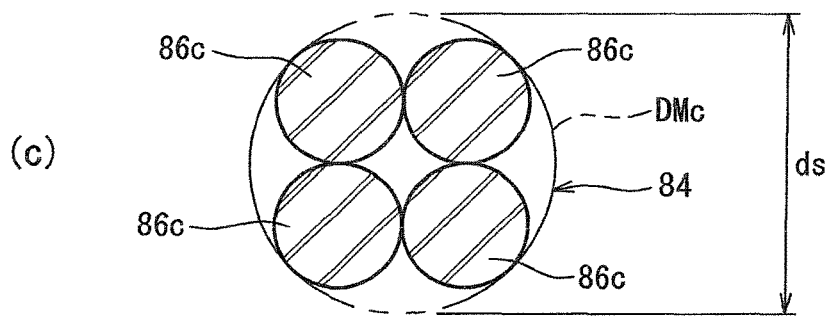
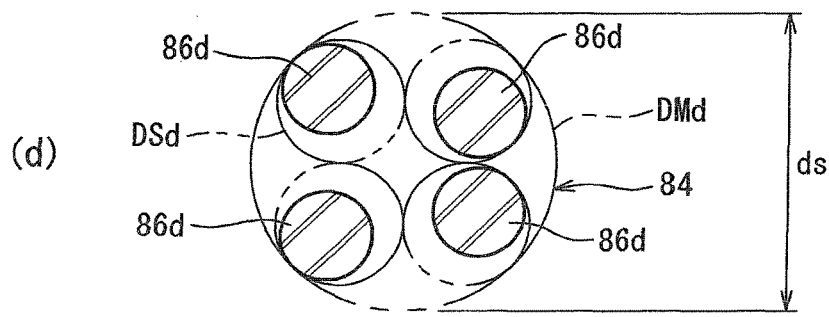

PNEUMATIC TIRE HAVING BEAD CORE WITH STRETCHABLE PORTION

TECHNICAL FIELD

The present invention relates to pneumatic tires.

BACKGROUND ART

FIG. 14 shows a conventional pneumatic tire 2. The tire 2 includes a pair of beads 4 and a carcass 6. Each bead 4 includes a ring-shaped core 8 and an apex 10 extending from the core 8 outward in a radial direction. The carcass 6 extends on and between one of the beads 4 and the other bead 4.

FIG. 15 shows a cross-section of the core 8 of the bead 4. The core 8 includes a cord 12 extending in a circumferential direction. In the bead 4, the core 8 is formed by winding the cord 12 in the circumferential direction a plurality of times.

The tire 2 is fitted onto a rim. When the tire 2 is fitted onto the rim, each bead 4 portion comes into contact with a flange of the rim. As described above, the core 8 is formed by winding the cord 12 in the circumferential direction a plurality of times. The core 8 tightens the rim. Thus, the tire 2 is prevented from being displaced or coming off from the rim.

FIG. 16 shows a state where the tire 2 is fitted onto a rim 14. As shown in the drawing, one bead 4a portion is brought into contact with one flange 16a of the rim 14. The other bead 4b portion is dropped into a drop 18 of the rim 14. Air is injected into the space surrounded by the inner surface of the tire 2 and the rim 14, whereby the other bead 4b portion comes into contact with the other flange 16b. Accordingly, fitting the tire 2 onto the rim 14 is completed. The pressure of the air injected during fitting is referred to as fitting pressure. The fitting pressure influences ease of fitting the tire 2 onto the rim 14. Various examinations have been made in order to reduce the fitting pressure. One example of the examinations is disclosed in JP2002-36830.

CITATION LIST

Patent Literature

Patent Literature 1: JP2002-36830

SUMMARY OF THE INVENTION

Problems to be Solved by the Invention

FIG. 17 shows movement of the bead 4 portion of the tire 2 during fitting. As shown in the drawing, when air is injected into the interior of the tire 2, the bead 4 portion moves along the rim 14 outward in an axial direction. The bead 4 portion passes over a hump 20 and comes into contact with the flange 16b of the rim 14.

As is obvious from the drawing, when the bead 4 portion passes over the hump 20, the core 8 is stretched most. At this time, the tension of the core 8 becomes maximum. In particular, great tension is applied to a cord 12a at a portion, at the inner side in the axial direction and at the outer side in the radial direction, of the cross-section of the core 8 shown in FIG. 15.

Normally, an element wire formed from steel is used for the cord 12 of the core 8. The cord 12 is difficult to stretch, that is, non-stretchable. The non-stretchable cord 12 influences deformation of the core 8.

There is a need for reducing flattening of a tire. A tire with low flattening is easily displaced or comes off from a rim. For preventing the tire from being displaced or coming off from the rim, it is effective to enhance a tightening force generated by a core. However, a core having an enhanced tightening force is difficult to deform. With the core that is difficult to deform, a bead portion is difficult to pass over a hump. For fitting the tire onto the rim, a high fitting pressure is required. An excessively high fitting pressure influences the workability.

From the standpoint that running can continue at a high speed for a certain distance even during puncture, a run flat tire having a reinforced rubber layer provided at each sidewall portion may be adopted. In the run flat tire, each sidewall portion has high stiffness, and thus the run flat tire is easily displaced or comes off from a rim. For preventing the run flat tire from being displaced or coming off from the rim, it is effective to enhance a tightening force generated by a core, similarly to the above-described tire with low flattening. However, a core having an enhanced tightening force is difficult to deform. With the core that is difficult to deform, a bead portion is difficult to pass over a hump. For fitting the tire onto the rim, a high fitting pressure is required. An excessively high fitting pressure influences the workability.

An object of the present invention is to provide a pneumatic tire that allows a low fitting pressure to be achieved without impairing a tightening force.

Solution to the Problems

A pneumatic tire according to the present invention includes a pair of ring-shaped beads and a carcass extending on and between one of the beads and the other bead. Each bead includes a core and an apex extending from the core outward in a radial direction. The core includes: a main body including a cord extending in a circumferential direction; and a stretchable portion formed from a crosslinked rubber. The stretchable portion is located inward of the main body in an axial direction. The stretchable portion has a size with which at least one cross-section of the cord can be included therein in a cross-section of the bead.

Preferably, in the pneumatic tire, the main body includes a hard unit and a soft unit. The soft unit is located outward of the hard unit in the radial direction. The hard unit includes a hard cord extending in the circumferential direction. The soft unit includes a soft cord extending in the circumferential direction. The soft cord stretches more easily than the hard cord. The stretchable portion has a size with which at least one cross-section of the hard cord can be included therein in the cross-section of the bead.

Preferably, in the pneumatic tire, the main body further includes a middle unit. The middle unit is located outward of the hard unit in the radial direction and located outward of the soft unit in the axial direction. The middle unit includes a middle cord extending in the circumferential direction. The middle cord stretches more easily than the hard cord. The soft cord stretches more easily than the middle cord. In a cross-section of the main body, one cross-section of the middle cord is located outward of one cross-section of the hard cord in the radial direction and inward of the one cross-section of the hard cord in the axial direction. One cross-section of the soft cord is located outward of the one cross-section of the middle cord in the radial direction and inward of the one cross-section of the middle cord in the axial direction.

Another pneumatic tire according to the present invention includes a pair of ring-shaped beads and a carcass extending on and between one of the beads and the other bead. Each bead includes a core and an apex extending from the core outward in a radial direction. The core includes a hard unit and a soft unit. The hard unit includes a hard cord extending in a circumferential direction. The soft unit includes a soft cord extending in the circumferential direction. The soft cord stretches more easily than the hard cord. One cross-section of the hard cord is located at a portion, at an outer side in an axial direction and at an inner side in the radial direction, of a cross-section of the core. One cross-section of the soft cord is located at a portion, at an inner side in the axial direction and at an outer side in the radial direction, of the cross-section of the core.

Preferably, in the pneumatic tire, the core further includes a middle unit. The middle unit is located between the hard unit and the soft unit. The middle unit includes a middle cord extending in the circumferential direction. The middle cord stretches more easily than the hard cord. The soft cord stretches more easily than the middle cord. In the cross-section of the core, one cross-section of the middle cord is located outward of the one cross-section of the hard cord in the radial direction and inward of the one cross-section of the hard cord in the axial direction. The one cross-section of the soft cord is located outward of the one cross-section of the middle cord in the radial direction and inward of the one cross-section of the middle cord in the axial direction.

Advantageous Effects of the Invention

In the pneumatic tire according to the present invention, the configuration of each bead is adjusted such that a portion to which great tension is applied when the pneumatic tire is fitted onto a rim easily stretches. With the tire, a low fitting pressure is achieved without impairing a tightening force.

BRIEF DESCRIPTION OF THE DRAWINGS

FIG. 5 shows cross-sectional views of examples of a cord used for forming a core of a bead as a component of the tire in FIG. 4.

DESCRIPTION OF EMBODIMENTS

The following will describe in detail the present invention based on preferred embodiments with appropriate reference to the drawings.

Figure 1:
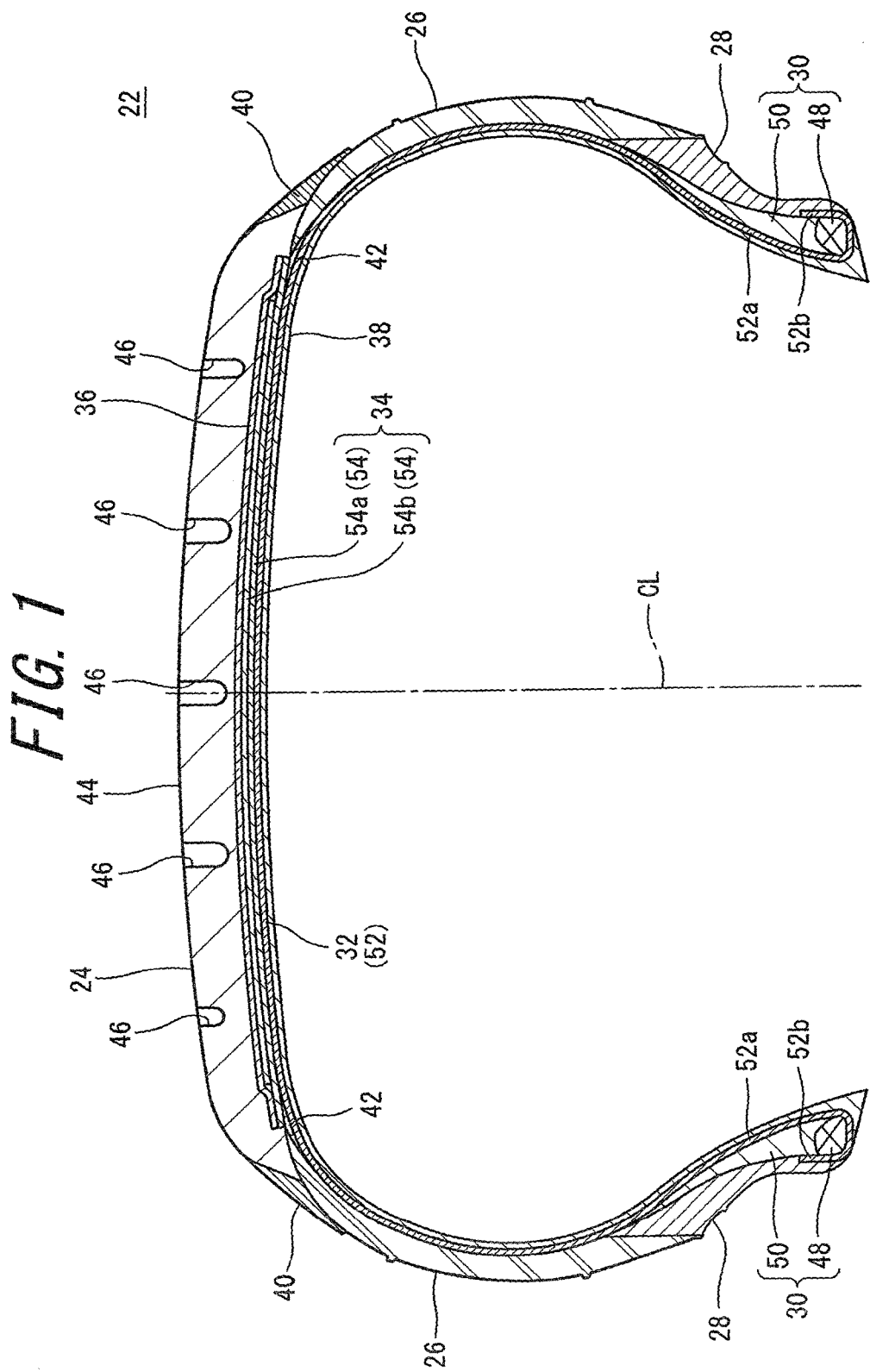
FIG. 1 is a cross-sectional view showing a portion of a pneumatic tire according to one embodiment of the present invention.

FIG. 1 shows a pneumatic tire 22. In FIG. 1, the up-down direction is the radial direction of the tire 22, the right-left direction is the axial direction of the tire 22, and the direction perpendicular to the surface of the sheet is the circumferential direction of the tire 22. In FIG. 1, an alternate long and short dash line CL represents the equator plane of the tire 22. The shape of the tire 22 is symmetrical about the equator plane except for a tread pattern. FIG. 1 shows a cross-section of the tire 22 along the radial direction.

The tire 22 includes a tread 24, sidewalls 26, clinches 28, beads 30, a carcass 32, a belt 34, a band 36, an inner liner 38, wings 40, and cushion layers 42. The tire 22 is of a tubeless type. The tire 22 is mounted on a passenger car.

The tread 24 has a shape projecting outward in the radial direction. The tread 24 forms a tread surface 44 that is brought into contact with a road surface. Grooves 46 are formed on the tread surface 44. The tread pattern is formed by the grooves 46. The tread 24 includes a base layer and a cap layer, which are not shown. The cap layer is located outward of the base layer in the radial direction. The cap layer is laminated on the base layer. The base layer is formed from a crosslinked rubber that is excellent in adhesiveness. A typical base rubber of the base layer is a natural rubber. The cap layer is formed from a crosslinked rubber that is excellent in wear resistance, heat resistance, and grip performance.

The sidewalls 26 extend from the edges of the tread 24 substantially inward in the radial direction. The outer edges, in the radial direction, of the sidewalls 26 are joined to the tread 24. The inner edges, in the radial direction, of the sidewalls 26 are joined to the clinches 28. The sidewalls 26 are formed from a crosslinked rubber that is excellent in cut resistance and weather resistance. The sidewalls 26 prevent the carcass 32 from being damaged.

The clinches 28 are located substantially inward of the sidewalls 26 in the radial direction. The clinches 28 are located outward of the beads 30 and the carcass 32 in the axial direction. The clinches 28 are formed from a crosslinked rubber that is excellent in wear resistance. The clinches 28 come into contact with flanges of a rim.

The beads 30 are located inward of the clinches 28 in the axial direction. Each bead 30 has a ring shape. Each bead 30 includes a core 48 and an apex 50. The apex 50 extends from the core 48 outward in the radial direction. The apex 50 is tapered outward in the radial direction. The apex 50 is formed from a highly hard crosslinked rubber.

The carcass 32 is formed of a carcass ply 52. The carcass ply 52 extends on and between the beads 30 at both sides and along the tread 24 and the sidewalls 26. The carcass ply 52 is turned up around each core 48 from the inner side to the outer side in the axial direction. Due to this turning-up, a main portion 52a and turned-up portions 52b are formed in the carcass ply 52.

The carcass ply 52 includes a large number of cords aligned with each other, and a topping rubber. The absolute value of the angle of each cord relative to the equator plane is 75° to 90°. In other words, the carcass 32 has a radial structure. The cords are formed from an organic fiber. Examples of preferable organic fibers include polyester fibers, nylon fibers, rayon fibers, polyethylene naphthalate fibers, and aramid fibers. The carcass 32 may be formed of two or more carcass plies 52.

The belt 34 is located inward of the tread 24 in the radial direction. The belt 34 is laminated on the carcass 32. The belt 34 reinforces the carcass 32. The belt 34 includes an inner layer 54a and an outer layer 54b. As is obvious from FIG. 1, the width of the inner layer 54a is slightly larger than the width of the outer layer 54b in the axial direction. Each of the inner layer 54a and the outer layer 54b includes a large number of cords aligned with each other, and a topping rubber, which are not shown. Each cord is tilted relative to the equator plane. The absolute value of the tilt angle is generally equal to or greater than 10° and equal to or less than 35°. The direction in which each cord of the inner layer 54a is tilted relative to the equator plane is opposite to the direction in which each cord of the outer layer 54b is tilted relative to the equator plane. The material of the cords is preferably steel. An organic fiber may be used for the cords. The width of the belt 34 in the axial direction is preferably equal to or greater than 0.7 times of the maximum width of the tire 22. The belt 34 may include three or more layers 54.

The band 36 is located outward of the belt 34 in the radial direction. The width of the band 36 is equal to the width of the belt 34 in the axial direction. The band 36 includes a cord and a topping rubber, which are not shown. The cord is helically wound. The band 36 has a so-called jointless structure. The cord extends substantially in the circumferential direction. The angle of the cord relative to the circumferential direction is equal to or less than 5° and further equal to or less than 2°. The belt 34 is held by the cord, so that lifting of the belt 34 is suppressed. The cord is formed from an organic fiber. Examples of preferable organic fibers include nylon fibers, polyethylene terephthalate fibers, rayon fibers, polyethylene naphthalate fibers, and aramid fibers.

The belt 34 and the band 36 form a reinforcing layer. A reinforcing layer may be composed of only the belt 34. A reinforcing layer may be composed of only the band 36.

The inner liner 38 is located inward of the carcass 32. The inner liner 38 is joined to the inner surface of the carcass 32. The inner liner 38 is formed from a crosslinked rubber. A rubber that is excellent in air blocking property is used for the inner liner 38. A typical base rubber of the inner liner 38 is an isobutylene-isoprene-rubber or halogenated isobutylene-isoprene-rubber. The inner liner 38 maintains the internal pressure of the tire 22.

Each wing 40 is located between the tread 24 and the sidewall 26. Each wing 40 is joined to each of the tread 24 and the sidewall 26. Each wing 40 is formed from a crosslinked rubber that is excellent in adhesiveness.

The cushion layers 42 are laminated on the carcass 32 near the edges of the belt 34. The cushion layers 42 are formed from a flexible crosslinked rubber. The cushion layers 42 absorb stress on the edges of the belt 34. The cushion layers 42 suppress lifting of the belt 34.

Figure 2:
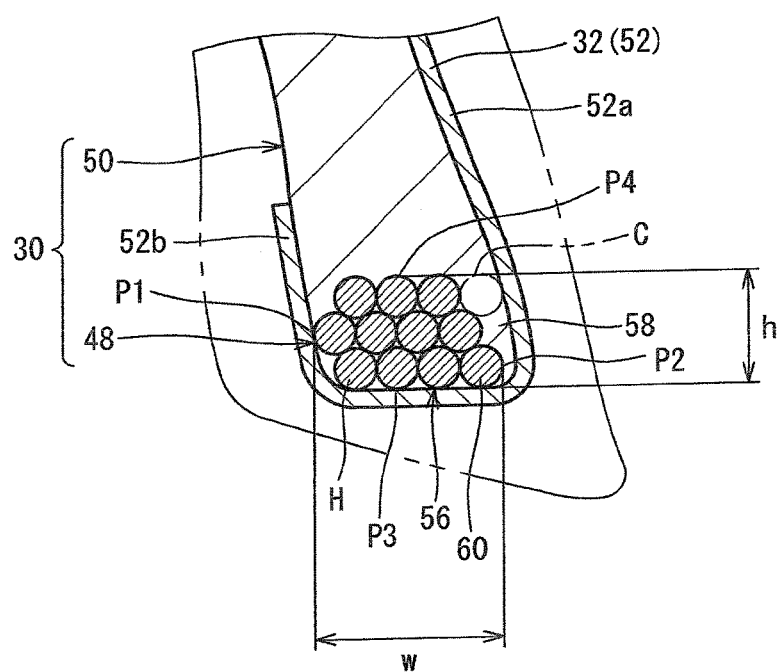
FIG. 2 is an enlarged cross-sectional view showing a portion of the tire in FIG. 1.

As described above, each bead 30 of the tire 22 includes the core 48 and the apex 50. FIG. 2 shows a cross-section of the core 48 that forms a portion of the bead 30. In FIG. 2, the up-down direction is the radial direction of the tire 22, the right-left direction is the axial direction of the tire 22, and the direction perpendicular to the surface of the sheet is the circumferential direction of the tire 22. In FIG. 2, the right side of the surface of the sheet is the inner side in the axial direction, and the left side of the surface of the sheet is the outer side in the axial direction. FIG. 2 shows a portion of a cross-section of the tire 22 along the radial direction.

The core 48 of the tire 22 includes a main body 56 and a stretchable portion 58. The core 48 is composed of the main body 56 and the stretchable portion 58.

Figure 3:
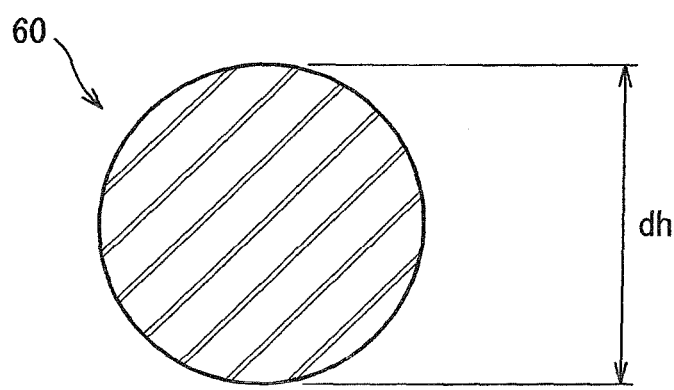
FIG. 3 is a cross-sectional view showing a cord used for forming a core of a bead.

The main body 56 is located outward of the stretchable portion 58 in the axial direction. The main body 56 includes a cord 60 extending in the circumferential direction. When the tire 22 is fitted on a rim, the main body 56 serves to tighten the tire 22 on the rim. FIG. 3 shows a cross-section of the cord 60 for the main body 56. The cord 60 is formed of an element wire.

In the tire 22, the main body 56 is formed by winding the cord 60 in the circumferential direction a plurality of times. Accordingly, the main body 56 is obtained in which cross-sections of the cord 60 are arranged in the axial direction and the radial direction. As shown in the drawing, the number of the cross-sections of the cord 60 included in a cross-section of the main body 56 is 11. The main body 56 of the tire 22 is formed by helically winding the cord 60 in the circumferential direction 11 times. The main body 56 may be formed by winding, in the circumferential direction, a bundle composed of a plurality of cords 60.

In the tire 22, the material of the cord 60 is preferably steel. The cord 60 is difficult to stretch as compared to one formed from an organic fiber. The cord 60 of which the material is steel can contribute to tightening the tire 22 on the rim.

In the tire 22, as the cord 60, one formed of a single element wire as shown in FIG. 3 is preferable. The cord 60 is difficult to stretch as compared to one formed of a plurality of element wires. The cord 60 can contribute to tightening the tire 22 on the rim.

In the tire 22, preferably, the material of the cord 60 is steel, and the cord 60 is formed of an element wire. The stretch of the cord 60 is small. In other words, the cord 60 is non-stretchable. The non-stretchable cord 60 can effectively contribute to tightening the tire 22 on the rim. The main body 56 composed of the non-stretchable cord 60 can firmly tighten the tire 22 on the rim.

In the tire 22, one cross-section (reference character H in FIG. 2) of the hard cord 60 is located at a portion, at the outer side in the axial direction and at the inner side in the radial direction, of the cross-section of the main body 56 of the core 48. As described above, the cord 60 is non-stretchable. The core 48 configured such that the non-stretchable cord 60 is located at the portion at the outer side in the axial direction and at the inner side in the radial direction can more firmly tighten the tire 22 on the rim.

In the present invention, the stretchability of the cord 60 is determined on the basis of an elongation at specific load (hereinafter, the elongation at specific load is sometimes referred to merely as "elongation"). More specifically, in the present invention, one having an elongation of less than 1% at a load of 44 N is determined as being non-stretchable. One having an elongation of 1% or greater at a load of 44 N is determined as being stretchable. One that breaks at a load less than 44 N is not used as the cord 60 for tightening the tire 22 on the rim. In the case where the cord 60 is formed from an organic fiber, an elongation at specific load is obtained according to JIS-L1017 "Testing methods for chemical fiber tire cords". In the case where the material of the cord 60 is steel, an elongation at specific load is obtained according to JIS-G3510 "Testing methods for steel tire cords". In the case where the cord 60 is formed from a glass fiber, an elongation at specific load is obtained according to JIS-R3420 "Testing methods for textile glass products". In the case where the cord 60 is formed from a carbon fiber, an elongation at specific load is obtained according to JIS-R7606 "Carbon fibre—Determination of the tensile properties of the single-filament specimens".

In the tire 22, the cord 60 for the main body 56 only needs to be non-stretchable, and is not limited to the element wire of which the material is steel. As long as the cord 60 is non-stretchable, one formed from an organic fiber, a glass fiber, or a carbon fiber may be used as the cord 60 of the main body 56, or one formed from a plurality of element wires (a stranded wire) may be used as the cord 60 of the main body 56. Examples of the organic fiber include nylon fibers, polyethylene terephthalate fibers, rayon fibers, polyethylene naphthalate fibers, and aramid fibers.

The stretchable portion 58 is located inward of the main body 56 in the axial direction. The stretchable portion 58 is located outward of the main portion 52a of the carcass ply 52 in the axial direction. The stretchable portion 58 is located between the main body 56 and the main portion 52a in the axial direction.

The stretchable portion 58 of the tire 22 is composed of a portion of the apex 50. Therefore, the stretchable portion 58 is formed from a crosslinked rubber. The stretchable portion 58 can stretch. As described above, the cord 60 that forms the main body 56 of the core 48 is non-stretchable. The stretchable portion 58 stretches more easily than the cord 60 of the main body 56.

As described above, the stretchable portion 58 of the tire 22 is composed of the portion of the apex 50. Therefore, the stretchable portion 58 is formed from a rubber composition that is the same as a rubber composition that forms the apex 50. The stretchable portion 58 may be formed from a rubber composition that is different from the rubber composition that forms the apex 50.

In the tire 22, a portion, at the inner side in the axial direction and at outer side in the radial direction, of the cross-section of the core 48 is composed of the stretchable portion 58. This portion corresponds to the portion in the core 8 of the conventional tire 2 in which portion the cord 12 is present and to which portion great tension is applied when the tire 2 is fitted onto the rim. As described above, the stretchable portion 58 stretches more easily than the cord 60 of the main body 56. Deformation of the core 48 is easy. When the tire 22 is fitted onto the rim, a bead 30 portion of the tire 22 easily passes over a hump of the rim. The fitting pressure of the tire 22 is low. Fitting the tire 22 onto the rim is easy. In addition, the main body 56 of the core 48 contributes to a tightening force. Thus, with the tire 22, a low fitting pressure is achieved without impairing the tightening force.

In FIG. 2, the size of a circle indicated by an alternate long and two short dashes line C is equal to the size of the cross-section of the cord 60 of the main body 56. As shown in the drawing, the stretchable portion 58 of the tire 22 has a size with which at least one cross-section of the cord 60 can be included therein in a cross-section of the bead 30. In the tire 22, a portion at which the cord 12 is wound in the conventional tire 2 is replaced with the stretchable portion 58 that is formed from the crosslinked rubber. This replacement can contribute to weight reduction of the tire 22. In addition, the stretchable portion 58 can contribute to reduction of the fitting pressure, and the main body 56 can contribute to the tightening force. With the tire 22, while the weight of the tire. 22 is reduced, a low fitting pressure can be achieved without impairing the tightening force. In the tire 22, in light of reduction of the weight and achievement of a low fitting pressure, the stretchable portion 58 may have a size with which two or more cross-sections of the cord 60 can be included therein in the cross-section of the bead 30.

In the tire 22, the width (a double-headed arrow W in FIG. 2) of the core 48 in the axial direction is equal to or greater than 1 mm and equal to or less than 50 mm. The height (a double-headed arrow h in FIG. 2) of the core 48 in the radial direction is equal to or greater than 1 mm and equal to or less than 50 mm. The width w is represented by the length in the axial direction from the outer edge (reference character P1 in FIG. 2) of the core 48 in the axial direction to the inner edge (reference character P2 in FIG. 2) of the core 48 in the axial direction. The height h is represented by the length in the radial direction from the inner edge (reference character P3) of the core 48 in the radial direction to the outer edge (reference character P4 in FIG. 2) of the core 48 in the radial direction.

In the tire 22, the ratio of the total sum HA of the areas of the cross-sections of the cord 60 included in the cross-section of the main body 56 of the core 48, relative to the area BA of the cross-section of the core 48, is preferably equal to or greater than 20% and equal to or less than 95%. When this ratio is set so as to be equal to or greater than 20%, an appropriate tightening force is obtained. When this ratio is set so as to be equal to or less than 95%, the stretchable portion 58 is sufficiently ensured, and thus weight reduction and a low fitting pressure are achieved. The area BA of the cross-section of the core 48 is represented by the product of the above-described width w in the axial direction and the above-described height h in the radial direction. In addition, in the case where the cord 60 is formed of a plurality of element wires, the areas of the cross-sections of the cord 60 are represented by the area of a virtual cross-section obtained on the basis of an outer diameter represented by the diameter of the circumcircle of these element wires.

In FIG. 3, a double-headed arrow dh indicates the outer diameter of the cord 60 for the main body 56 of the core 48. In light of tightening force, the outer diameter dh is preferably equal to or greater than 0.5 mm. In light of weight reduction, the outer diameter dh is preferably equal to or less than 10 mm.

In the present invention, the dimensions and angles of each component of the tire 22 are measured in a state where the tire 22 is mounted on a normal rim and inflated to a normal internal pressure. During the measurement, no load is applied to the tire 22. In the present specification, the normal rim means a rim specified in a standard on which the tire 22 is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire 22 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. It should be noted that in the case of a tire 22 for a passenger car, the dimensions and angles are measured in a state where the internal pressure is 180 kPa. The same also applies to tires described later.

Figure 4:
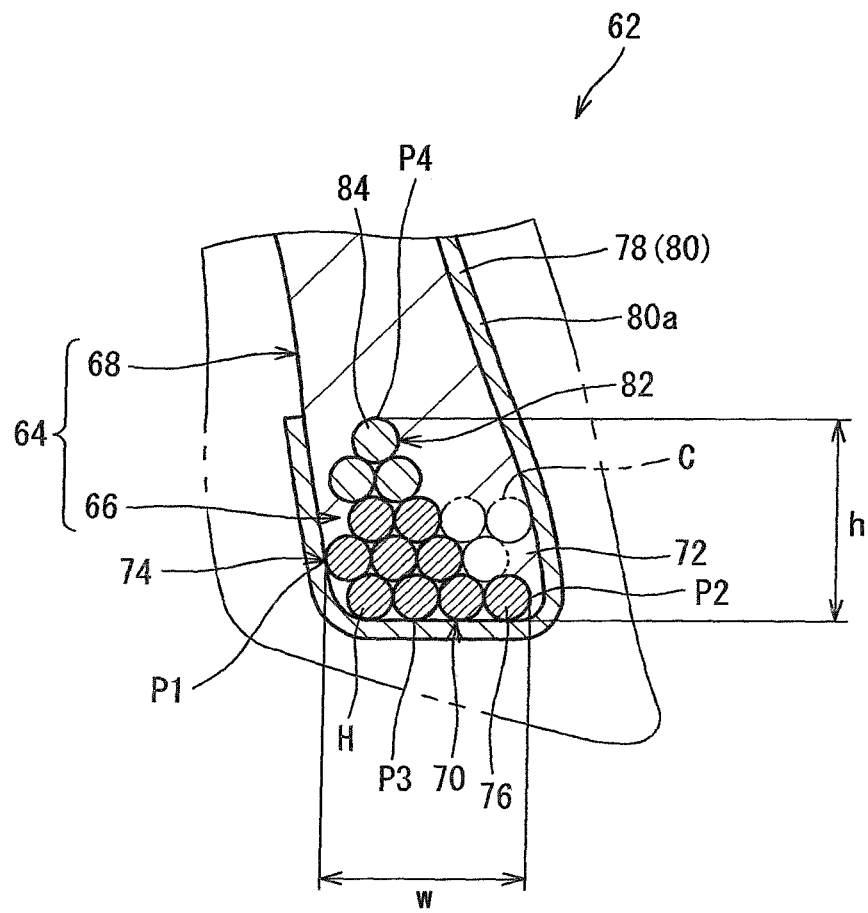
FIG. 4 is an enlarged cross-sectional view showing a portion of a pneumatic tire according to another embodiment of the present invention.

FIG. 4 shows a portion of a pneumatic tire 62 according to another embodiment of the present invention. FIG. 4 shows a bead 64 portion of the tire 62. In FIG. 4, the up-down direction is the radial direction of the tire 62, the right-left direction is the axial direction of the tire 62, and the direction perpendicular to the surface of the sheet is the circumferential direction of the tire 62. FIG. 4 shows a portion of a cross-section of the tire 62 along the radial direction. In FIG. 4, the right side of the surface of the sheet is the inner side in the axial direction, and the left side of the surface of the sheet is the outer side in the axial direction.

In the tire 62, the configuration except for the beads 64 is the same as that of the tire 22 shown in FIG. 1. The tire 62 includes, in addition to the beads 64, a tread, sidewalls, clinches, a carcass, a belt, a band, an inner liner, wings, and cushion layers.

In the tire 62, each bead 64 has a ring shape. Each bead 64 includes a core 66 and an apex 68. The apex 68 extends from the core 66 outward in the radial direction. The apex 68 is tapered outward in the radial direction, which is not shown. The apex 68 is formed from a highly hard crosslinked rubber.

The core 66 of the tire 62 includes a main body 70 and a stretchable portion 72. The core 66 is composed of the main body 70 and the stretchable portion 72. The main body 70 includes a hard unit 74.

The hard unit 74 is located outward of the stretchable portion 72 in the axial direction. The hard unit 74 includes a hard cord 76 extending in the circumferential direction. When the tire 62 is fitted on a rim, the hard unit 74 serves to tighten the tire 62 on the rim.

In the tire 62, the hard unit 74 is formed by winding the hard cord 76 in the circumferential direction a plurality of times. Accordingly, the hard unit 74 is obtained in which cross-sections of the hard cord 76 are arranged in the axial direction and the radial direction. As shown in the drawing, the number of the cross-sections of the hard cord 76 included in a cross-section of the hard unit 74 is nine. The hard unit 74 of the tire 62 is formed by helically winding the hard cord 76 in the circumferential direction nine times. The hard unit 74 may be formed by winding, in the circumferential direction, a bundle composed of a plurality of hard cords 76.

In the tire 62, the material of the hard cord 76 is preferably steel. The hard cord 76 is difficult to stretch as compared to one formed from an organic fiber. The hard cord 76 can contribute to tightening the tire 62 on the rim.

In the tire 62, as the hard cord 76, one formed of the single element wire as shown in FIG. 3 is preferable. The hard cord 76 is difficult to stretch as compared to one formed of a plurality of element wires. The hard cord 76 can contribute to tightening the tire 62 on the rim.

In the tire 62, preferably, the material of the hard cord 76 is steel, and the hard cord 76 is formed of an element wire. The stretch of the hard cord 76 is small. In other words, the hard cord 76 is non-stretchable. The non-stretchable hard cord 76 can effectively contribute to tightening the tire 62 on the rim. The hard unit 74 composed of the non-stretchable hard cord 76 can firmly tighten the tire 62 on the rim.

In the tire 62, one cross-section (reference character H in FIG. 4) of the hard cord 76 is located at a portion, at the outer side in the axial direction and at the inner side in the radial direction, of a cross-section of the main body 70 that forms a portion of the core 66. As described above, the hard cord 76 is non-stretchable. The core 66 configured such that the hard cord 76 is located at the portion at the outer side in the axial direction and at the inner side in the radial direction can more firmly tighten the tire 62 on the rim.

In the tire 62, the hard cord 76 only needs to be non-stretchable, and is not limited to the element wire of which the material is steel. One formed from an organic fiber, a glass fiber, or a carbon fiber may be used as the hard cord 76, or one formed from a plurality of element wires may be used as the hard cord 76, as long as it is non-stretchable. Examples of the organic fiber include nylon fibers, polyethylene terephthalate fibers, rayon fibers, polyethylene naphthalate fibers, and aramid fibers.

In the tire 62, in light of tightening force, the outer diameter dh of the hard cord 76 is preferably equal to or greater than 0.5 mm. In light of weight reduction, the outer diameter dh of the hard cord 76 is preferably equal to or less than 10 mm.

The stretchable portion 72 is located inward of the main body 70 in the axial direction. The stretchable portion 72 is located outward, in the axial direction, of a main portion 80a of a carcass ply 80 that forms a carcass 78. The stretchable portion 72 is located between the main body 70 and the main portion 80a in the axial direction.

The stretchable portion 72 of the tire 62 is composed of a portion of the apex 68. Therefore, the stretchable portion 72 is formed from a crosslinked rubber. The stretchable portion 72 can stretch. As described above, the hard cord 76 that forms a portion of the main body 70 of the core 66, is non-stretchable. The stretchable portion 72 stretches more easily than the hard cord 76.

As described above, the stretchable portion 72 of the tire 62 is composed of the portion of the apex 68. Therefore, the stretchable portion 72 is formed from a rubber composition that is the same as a rubber composition that forms the apex 68. The stretchable portion 72 may be formed from a rubber composition that is different from the rubber composition that forms the apex 68.

In the tire 62, a portion, at the inner side in the axial direction and at the outer side in the radial direction, of a cross-section of the core 66 is composed of the stretchable portion 72. In the tire 62, the stretchable portion 72 is located at the portion in the core 8 of the conventional tire 2 in which portion the cord 12 is present and to which portion great tension is applied when the tire 2 is fitted onto the rim. As described above, the stretchable portion 72 stretches more easily than the hard cord 76. Deformation of the core 66 is easy. When the tire 62 is fitted onto the rim, the bead 64 portion of the tire 62 easily passes over a hump of the rim. The fitting pressure of the tire 62 is low. Fitting the tire 62 onto the rim is easy. In addition, the main body 70 of the core 66 contributes to a tightening force. Thus, with the tire 62, a low fitting pressure is achieved without impairing the tightening force.

In FIG. 4, the size of a circle indicated by an alternate long and two short dashes line C is equal to the size of each cross-section of the hard cord 76. As shown in the drawing, the stretchable portion 72 of the tire 62 has a size with which at least three cross-sections of the hard cord 76 can be included therein in a cross-section of the bead 64. In the tire 62, the portion at which the cord 12 is wound in the conventional tire 2 is replaced with the stretchable portion 72 that is formed from the crosslinked rubber. This replacement can contribute to weight reduction of the tire 62. In addition, the stretchable portion 72 can contribute to reduction of the fitting pressure, and the main body 70 can contribute to the tightening force. With the tire 62, while the weight of the tire 62 is reduced, a low fitting pressure can be achieved without impairing the tightening force.

In the tire 62, in addition to the hard unit 74, the main body 70 further includes a soft unit 82. That is, the main body 70 includes the hard unit 74 and the soft unit 82. The soft unit 82 is located outward of the hard unit 74 in the radial direction. The soft unit 82 includes a soft cord 84 extending in the circumferential direction. When the tire 62 is fitted on the rim, the soft unit 82 serves to tighten the tire 62 on the rim.

In the tire 62, the soft unit 82 is formed by winding the soft cord 84 in the circumferential direction a plurality of times. Accordingly, the soft unit 82 is obtained in which cross-sections of the soft cord 84 are arranged in the axial direction and the radial direction. As shown in the drawing, the number of the cross-sections of the soft cord 84 included in a cross-section of the soft unit 82 is three. The soft unit 82 of the tire 62 is formed by helically winding the soft cord 84 in the circumferential direction three times. The soft unit 82 may be formed by winding, in the circumferential direction, a bundle composed of a plurality of soft cords 84.

The soft cord 84 stretches more easily than the above-described hard cord 76. The elongation of the soft cord 84 is greater than the elongation of the hard cord 76. Thus, when the tire 62 is fitted onto the rim, the soft unit 82 composed of the soft cord 84 does not inhibit deformation of the core 66. Since the core 66 easily deforms, the bead 64 portion of the tire 62 easily passes over the hump of the rim. According to the present invention, the tire 62 can be fitted onto the rim at a low fitting pressure. Fitting the tire 62 onto the rim is easy. In addition, due to a synergistic effect of the hard unit 74 and the soft unit 82, the core 66 can more firmly tighten the tire 62 on the rim. With the tire 62, a low fitting pressure is achieved without impairing the tightening force.

Diagram (a) of FIG. 5 shows an example of the soft cord 84. The soft cord 84 is formed by twisting together three element wires 86a. As described above, the hard cord 76 is formed of a single element wire. The soft cord 84 stretches more easily than the hard cord 76. Thus, when the tire 62 is fitted onto the rim, the soft unit 82 composed of the soft cord 84 does not inhibit deformation of the core 66. Since the core 66 easily deforms, the bead 64 portion of the tire 62 easily passes over the hump of the rim. According to the present invention, the tire 62 can be fitted onto the rim at a low fitting pressure. Fitting the tire 62 onto the rim is easy. Furthermore, in addition to the hard unit 74, the soft unit 82 synergistically contributes to the tightening force. Thus, a sufficient tightening force is obtained. With the tire 62, a low fitting pressure is achieved without impairing the tightening force.

In (a) of FIG. 5, an alternate long and two short dashes line DMa indicates the circumcircle of the soft cord 84. The outer diameter (a double-headed arrow ds in (a) of FIG. 5) of the soft cord 84 is represented by the diameter of the circumcircle DMa. In light of tightening force, the outer diameter ds is preferably equal to or greater than 0.5 mm. In light of weight reduction, the outer diameter ds is preferably equal to or less than 10 mm.

Diagram (b) of FIG. 5 shows another example of the soft cord 84. The soft cord 84 is formed by twisting together three element wires 86b that are reformed in a wavy shape. As described above, the hard cord 76 is formed of a single element wire. The soft cord 84 stretches more easily than the hard cord 76. Thus, when the tire 62 is fitted onto the rim, the soft unit 82 composed of the soft cord 84 does not inhibit deformation of the core 66. Since the core 66 easily deforms, the bead 64 portion of the tire 62 easily passes over the hump of the rim. According to the present invention, the tire 62 can be fitted onto the rim at a low fitting pressure. Fitting the tire 62 onto the rim is easy. Furthermore, in addition to the hard unit 74, the soft unit 82 synergistically contributes to the tightening force. Thus, a sufficient tightening force is obtained. With the tire 62, a low fitting pressure is achieved without impairing the tightening force.

In (b) of FIG. 5, an alternate long and two short dashes line DMb indicates the circumcircle of the soft cord 84. The outer diameter (a double-headed arrow ds in (b) of FIG. 5) of the soft cord 84 is represented by the diameter of the circumcircle DMb. In light of tightening force, the outer diameter ds is preferably equal to or greater than 0.5 mm. In light of weight reduction, the outer diameter ds is preferably equal to or less than 10 mm. An alternate long and two short dashes line DSb indicates the circumcircle of the element wire 86b that is reformed in a wavy shape. Each element wire 86b is reformed in a wavy shape, for example, by using a device (not shown). The device includes two disc-shaped rollers. Each roller has a plurality of projections arranged on the circumferential surface thereof so as to be spaced apart from each other. A recess is formed between the two projections that are adjacent to each other. When both rollers rotate, the projection of one of the rollers is fitted into the recess of the other roller, and the projection of the other roller is fitted into the recess of the one roller. By passing the element wire 86b between both rollers, the element wire 86b having a straight shape is processed into a zigzag shape. Accordingly, the element wire 86b that is reformed in a wavy shape is obtained.

Diagram (c) of FIG. 5 shows still another example of the soft cord 84. The soft cord 84 is formed by twisting together four element wires 86c. As described above, the hard cord 76 is formed of a single element wire. The soft cord 84 stretches more easily than the hard cord 76. Thus, when the tire 62 is fitted onto the rim, the soft unit 82 composed of the soft cord 84 does not inhibit deformation of the core 66. Since the core 66 easily deforms, the bead 64 portion of the tire 62 easily passes over the hump of the rim. According to the present invention, the tire 62 can be fitted onto the rim at a low fitting pressure. Fitting the tire 62 onto the rim is easy. Furthermore, in addition to the hard unit 74, the soft unit 82 synergistically contributes to the tightening force. Thus, a sufficient tightening force is obtained. With the tire 62, a low fitting pressure is achieved without impairing the tightening force.

In (c) of FIG. 5, an alternate long and two short dashes line DMc indicates the circumcircle of the soft cord 84. The outer diameter (a double-headed arrow ds in (c) of FIG. 5) of the soft cord 84 is represented by the diameter of the circumcircle DMc. In light of tightening force, the outer diameter ds is preferably equal to or greater than 0.5 mm. In light of weight reduction, the outer diameter ds is preferably equal to or less than 30 mm.

Diagram (d) of FIG. 5 shows still another example of the soft cord 84. The soft cord 84 is formed by twisting together four element wires 86d that are reformed in a wavy shape. As described above, in the tire 62, the hard cord 76 is formed of a single element wire. The soft cord 84 stretches more easily than the hard cord 76. Thus, when the tire 62 is fitted onto the rim, the soft unit 82 composed of the soft cord 84 does not inhibit deformation of the core 66. Since the core 66 easily deforms, the bead 64 portion of the tire 62 easily passes over the hump of the rim. According to the present invention, the tire 62 can be fitted onto the rim at a low fitting pressure. Fitting the tire 62 onto the rim is easy.

Furthermore, in addition to the hard unit 74, the soft unit 82 synergistically contributes to the tightening force. Thus, a sufficient tightening force is obtained. With the tire 62, a low fitting pressure is achieved without impairing the tightening force.

In (d) of FIG. 5, an alternate long and two short dashes line DMd indicates the circumcircle of the soft cord 84. The outer diameter (a double-headed arrow ds in (d) of FIG. 5) of the soft cord 84 is represented by the diameter of the circumcircle DMd. In light of tightening force, the outer diameter ds is preferably equal to or greater than 0.5 mm. In light of weight reduction, the outer diameter ds is preferably equal to or less than 30 mm. In the drawing, an alternate long and two short dashes line DSd indicates the circumcircle of the element wire 86d that is reformed in a wavy shape.

In the tire 62, the soft cord 84 only needs to have an elongation greater than the elongation of the hard cord 76, and is not limited to one formed by twisting together a plurality of element wires of each of which the material is steel. A raw yarn formed from an organic fiber, a glass fiber, or a carbon fiber may be used as the soft cord 84, or one formed by twisting together a plurality of the raw yarns may be used as the soft cord 84, as long as it stretches more easily than the hard cord 76. Examples of the organic fiber include nylon fibers, polyethylene terephthalate fibers, rayon fibers, polyethylene naphthalate fibers, and aramid fibers.

An elongation EH at specific load (hereinafter, elongation EH) of the hard cord 76 and an elongation ES at specific load (hereinafter, elongation ES) of the soft cord 84 influence the tightening force and the fitting pressure. In the tire 62, in light of reduction of the fitting pressure, the ratio of the elongation ES relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 62, the width (a double-headed arrow w in FIG. 4) of the core 66 in the axial direction is equal to or greater than 1 mm and equal to or less than 50 mm. The height (a double-headed arrow h in FIG. 4) of the core 66 in the radial direction is equal to or greater than 1 mm and equal to or less than 50 mm. The width w is represented by the length in the axial direction from the outer edge (reference character P1 in FIG. 4) of the core 66 in the axial direction to the inner edge (reference character P2 in FIG. 4) of the core 66 in the axial direction. The height h is represented by the length in the radial direction from the inner edge (reference character P3 in FIG. 4) of the core 66, in the radial direction to the outer edge (reference character P4 in FIG. 4) of the core 66 in the radial direction.

In the tire 62, the ratio of the sum (HA+SA) of the total sum HA of the areas of the cross-sections of the hard cord 76 included in the cross-section of the hard unit 74 of the core 66 and the total sum SA of the areas of the cross-sections of the soft cord 84 included in the cross-section of the soft unit 82 of the core 66, relative to the area BA of the cross-section of the core 66, is preferably equal to or greater than 15% and equal to or less than 95%. When this ratio is set so as to be equal to or greater than 15%, an appropriate tightening force is obtained. When this ratio is set so as to be equal to or less than 95%, the stretchable portion 72 is sufficiently ensured, and thus weight reduction and a low fitting pressure are achieved. The area BA of the cross-section of the core 66 is represented by the product of the above-described width w in the axial direction and the above-described height h in the radial direction.

In the tire 62, the ratio of the total sum HA of the areas of the cross-sections of the hard cord 76 included in the cross-section of the hard unit 74, relative to the area BA of the cross-section of the core 66, is preferably equal to or greater than 10% and equal to or less than 90%. When this ratio is set so as to be equal to or greater than 10%, an appropriate tightening force is obtained. When this ratio is set so as to be equal to or less than 90%, weight reduction and a low fitting pressure are achieved.

In the tire 62, the ratio of the total sum SA of the areas of the cross-sections of the soft cord 84 included in the cross-section of the soft unit 82, relative to the area BA of the cross-section of the core 66, is preferably equal to or greater than 5% and equal to or less than 80%. When this ratio is set so as to be equal to or greater than 5%, an appropriate tightening force is obtained. When this ratio is set so as to be equal to or less than 80%, weight reduction and a low fitting pressure are achieved.

Figure 6:
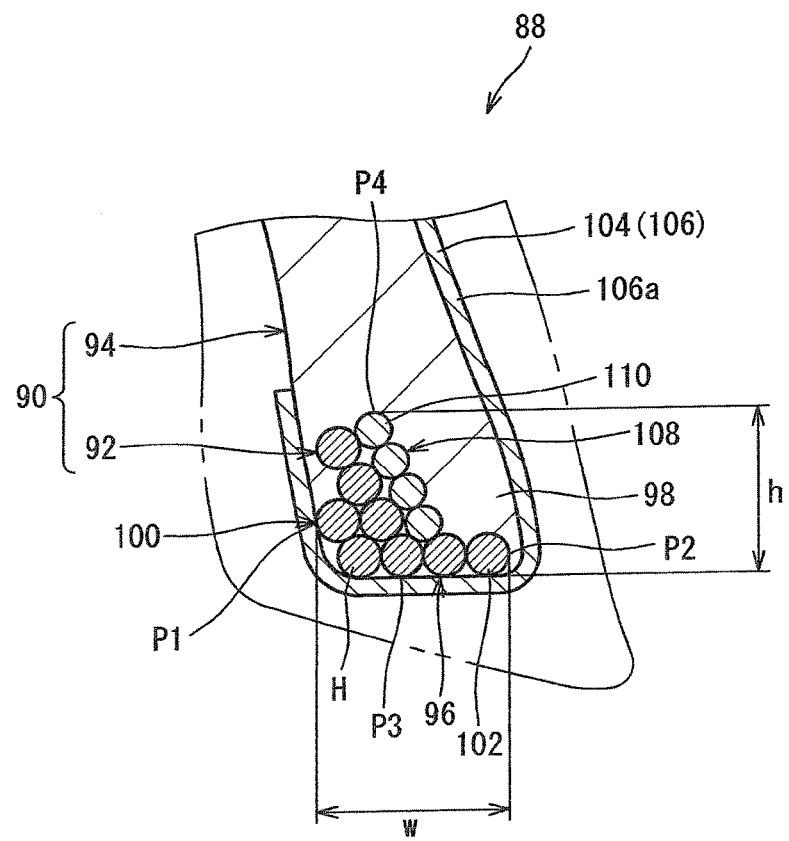
FIG. 6 is an enlarged cross-sectional view showing a portion of a pneumatic tire according to still another embodiment of the present invention.

FIG. 6 shows a portion of a pneumatic tire 88 according to sill another embodiment of the present invention. FIG. 6 shows a bead 90 portion of the tire 88. In FIG. 6, the up-down direction is the radial direction of the tire 88, the right-left direction is the axial direction of the tire 88, and the direction perpendicular to the surface of the sheet is the circumferential direction of the tire 88. FIG. 6 shows a portion of a cross-section of the tire 88 along the radial direction. In FIG. 6, the right side of the surface of the sheet is the inner side in the axial direction, and the left side of the surface of the sheet is the outer side in the axial direction.

In the tire 88, the configuration except for the beads 90 is the same as that of the tire 22 shown in FIG. 1. The tire 88 includes, in addition to the beads 90, a tread, sidewalls, clinches, a carcass, a belt, a band, an inner liner, wings, and cushion layers.

In the tire 88, each bead 90 has a ring shape. Each bead 90 includes a core 92 and an apex 94. The apex 94 extends from the core 92 outward in the radial direction. The apex 94 is tapered outward in the radial direction, which is not shown. The apex 94 is formed from a highly hard cross-linked rubber.

The core 92 of the tire 88 includes a main body 96 and a stretchable portion 98. The core 92 is composed of the main body 96 and the stretchable portion 98. The main body 96 includes a hard unit 100.

The hard unit 100 is located outward of the stretchable portion 98 in the axial direction. The hard unit 100 includes a hard cord 102 extending in the circumferential direction. When the tire 88 is fitted on a rim, the hard unit 100 serves to tighten the tire 88 on the rim.

In the tire 88, the hard unit 100 is formed by winding the hard cord 102 in the circumferential direction a plurality of times. Accordingly, the hard unit 100 is obtained in which cross-sections of the hard cord 102 are arranged in the axial direction and the radial direction. As shown in the drawing, the number of the cross-sections of the hard cord 102 included in a cross-section of the hard unit 100 is eight. The hard unit 100 of the tire 88 is formed by helically winding the hard cord 102 in the circumferential direction eight times. The hard unit 100 may be formed by winding, in the circumferential direction, a bundle composed of a plurality of hard cords 102.

In the tire 88, the material of the hard cord 102 is preferably steel. The hard cord 102 is difficult to stretch as compared to one formed from an organic fiber. The hard cord 102 can contribute to tightening the tire 88 on the rim.

In the tire 88, as the hard cord 102, one formed of the single element wire as shown in FIG. 3 is preferable. The hard cord 102 is difficult to stretch as compared to one formed of a plurality of element wires. The hard cord 102 can contribute to tightening the tire 88 on the rim.

In the tire 88, preferably, the material of the hard cord 102 is steel, and the hard cord 102 is formed of an element wire. The stretch of the hard cord 102 is small. In other words, the hard cord 102 is non-stretchable. The non-stretchable hard cord 102 can effectively contribute to tightening the tire 88 on the rim. The hard unit 100 composed of the non-stretchable hard cord 102 can firmly tighten the tire 88 on the rim.

In the tire 88, one cross-section (reference character H in FIG. 6) of the hard cord 102 is located at a portion, at the outer side in the axial direction and at the inner side in the radial direction, of a cross-section of the main body 96 of the core 92. As described above, the hard cord 102 is non-stretchable. The core 92 configured such that the hard cord 102 is located at the portion at the outer side in the axial direction and at the inner side in the radial direction can more firmly tighten the tire 88 on the rim.

In the tire 88, the hard cord 102 only needs to be non-stretchable, and is not limited to the element wire of which the material is steel. One formed from an organic fiber, a glass fiber, or a carbon fiber may be used as the hard cord 102, or one formed from a plurality of element wires may be used as the hard cord 102, as long as it is non-stretchable. Examples of the organic fiber include nylon fibers, polyethylene terephthalate fibers, rayon fibers, polyethylene naphthalate fibers, and aramid fibers.

In the tire 88, in light of tightening force, the outer diameter dh of the hard cord 102 is preferably equal to or greater than 0.5 mm. In light of weight reduction, the outer diameter dh of the hard cord 102 is preferably equal to or less than 10 mm.

The stretchable portion 98 is located inward of the main body 96 in the axial direction. The stretchable portion 98 is located outward, in the axial direction, of a main portion 106a of a carcass ply 106 that forms a carcass 104. The stretchable portion 98 is located between the main body 96 and the main portion 106a in the axial direction.

The stretchable portion 98 of the tire 88 is composed of a portion of the apex 94. Therefore, the stretchable portion 98 is formed from a crosslinked rubber. The stretchable portion 98 can stretch. As described above, the hard cord 102 that forms a portion of the main body 96 of the core 92, is non-stretchable. The stretchable portion 98 stretches more easily than the hard cord 102.

As described above, the stretchable portion 98 of the tire 88 is composed of the portion of the apex 94. Therefore, the stretchable portion 98 is formed from a rubber composition that is the same as a rubber composition that forms the apex 94. The stretchable portion 98 may be formed from a rubber composition that is different from the rubber composition that forms the apex 94.

In the tire 88, a portion, at the inner side in the axial direction and at the outer side in the radial direction, of a cross-section of the core 92 is composed of the stretchable portion 98. In the tire 88, the stretchable portion 98 is located at the portion in the core 8 of the conventional tire 2 in which portion the cord 12 is present and to which portion great tension is applied when the tire 2 is fitted onto the rim. As described above, the stretchable portion 98 stretches more easily than the hard cord 102. Deformation of the core 92 is easy. When the tire 88 is fitted onto the rim, the bead 90 portion of the tire 88 easily passes over a hump of the rim. The fitting pressure of the tire 88 is low. Fitting the tire 88 onto the rim is easy. In addition, the main body 96 of the core 92 contributes to a tightening force. Thus, with the tire 88, a low fitting pressure is achieved without impairing the tightening force.

In the tire 88, the stretchable portion 98 has a size with which at least one cross-section of the hard cord 102 can be included therein in a cross-section of the bead 90. In the tire 88, the portion at which the cord 12 is wound in the conventional tire 2 is replaced with the stretchable portion 98 that is formed from the crosslinked rubber. This replacement can contribute to weight reduction of the tire 88. In addition, the stretchable portion 98 can contribute to reduction of the fitting pressure, and the main body 96 can contribute to the tightening force. With the tire 88, while the weight of the tire 88 is reduced, a low fitting pressure can be achieved without impairing the tightening force.

In the tire 88, in addition to the hard unit 100, the main body 96 further includes a soft unit 108. That is, the main body 96 includes the hard unit 100 and the soft unit 108. The soft unit 108 is located outward of the hard unit 100 in the radial direction. The soft unit 108 is located between the hard unit 100 and the stretchable portion 98 in the axial direction.

The soft unit 108 includes a soft cord 110 extending in the circumferential direction. When the tire 88 is fitted on the rim, the soft unit 108 serves to tighten the tire 88 on the rim.

In the tire 88, the soft unit 108 is formed by winding the soft cord 110 in the circumferential direction a plurality of times. Accordingly, the soft unit 108 is obtained in which cross-sections of the soft cord 110 are arranged in the axial direction and the radial direction. As shown in the drawing, the number of the cross-sections of the soft cord 110 included in a cross-section of the soft unit 108 is four. The soft unit 108 of the tire 88 is formed by helically winding the soft cord 110 in the circumferential direction four times. The soft unit 108 may be formed by winding, in the circumferential direction, a bundle composed of a plurality of soft cords 110.

The soft cord 110 stretches more easily than the above-described hard cord 102. The elongation of the soft cord 110 is greater than the elongation of the hard cord 102. Thus, when the tire 88 is fitted onto the rim, the soft unit 108 composed of the soft cord 110 does not inhibit deformation of the core 92. Since the core 92 easily deforms, the bead 90 portion of the tire 88 easily passes over the hump of the rim. According to the present invention, the tire 88 can be fitted onto the rim at a low fitting pressure. Fitting the tire 88 onto the rim is easy. In addition, due to a synergistic effect of the hard unit 100 and the soft unit 108, the core 92 can more firmly tighten the tire 88 on the rim. With the tire 88, a low fitting pressure is achieved without impairing the tightening force.

Examples of the soft cord 110 in the tire 88 include those having the configurations shown in (a) to (d) of FIG. 5 described above. The soft cord 110 only needs to have an elongation greater than the elongation of the hard cord 102, and is not limited to one formed by twisting together a plurality of element wires of each of which the material is steel. A raw yarn formed from an organic fiber, a glass fiber, or a carbon fiber may be used as the soft cord 110, or one formed by twisting together a plurality of the raw yarns may be used as the soft cord 110, as long as it stretches more easily than the hard cord 102. Examples of the organic fiber include nylon fibers, polyethylene terephthalate fibers, rayon fibers, polyethylene naphthalate fibers, and aramid fibers.

In the tire 88, in light of tightening force, the outer diameter ds of the soft cord 110 is preferably equal to or greater than 0.5 mm. In light of weight reduction, the outer diameter ds of the soft cord 110 is preferably equal to or less than 30 mm.

An elongation EH at specific load (hereinafter, elongation EH) of the hard cord 102 and an elongation ES at specific load (hereinafter, elongation ES) of the soft cord 110 influence the tightening force and the fitting pressure. In the tire 88, in light of reduction of the fitting pressure, the ratio of the elongation ES relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 88, the width (a double-headed arrow w in FIG. 6) of the core 92 in the axial direction is equal to or greater than 1 mm and equal to or less than 50 mm. The height (a double-headed arrow h in FIG. 6) of the core 92 in the radial direction is equal to or greater than 1 mm and equal to or less than 50 mm. The width w is represented by the length in the axial direction from the outer edge (reference character P1 in FIG. 6) of the core 92 in the axial direction to the inner edge (reference character P2 in FIG. 6) of the core 92 in the axial direction. The height h is represented by the length in the radial direction from the inner edge (reference character P3 in FIG. 6) of the core 92 in the radial direction to the outer edge (reference character P4 in FIG. 6) of the core 92 in the radial direction.

In the tire 88, the ratio of the sum (HA+SA) of the total sum HA of the areas of the cross-sections of the hard cord 102 included in the cross-section of the hard unit 100 of the core 92 and the total sum SA of the areas of the cross-sections of the soft cord 110 included in the cross-section of the soft unit 108 of the core 92, relative to the area BA of the cross-section of the core 92, is preferably equal to or greater than 15% and equal to or less than 95%. When this ratio is set so as to be equal to or greater than 15%, an appropriate tightening force is obtained. When this ratio is set so as to be equal to or less than 95%, the stretchable portion 98 is sufficiently ensured, and thus weight reduction and a low fitting pressure are achieved. The area BA of the cross-section of the core 92 is represented by the product of the above-described width w in the axial direction and the above-described height h in the radial direction.

In the tire 88, the ratio of the total sum HA of the areas of the cross-sections of the hard cord 102 included in the cross-section of the hard unit 100, relative to the area BA of the cross-section of the core 92, is preferably equal to or greater than 10% and equal to or less than 90%. When this ratio is set so as to be equal to or greater than 10%, an appropriate tightening force is obtained. When this ratio is set so as to be equal to or less than 90%, weight reduction and a low fitting pressure are achieved.

In the tire 88, the ratio of the total sum SA of the areas of the cross-sections of the soft cord 110 included in the cross-section of the soft unit 108, relative to the area BA of the cross-section of the core 92, is preferably equal to or greater than 5% and equal to or less than 80%. When this ratio is set so as to be equal to or greater than 5%, an appropriate tightening force is obtained. When this ratio is set so as to be equal to or less than 80%, weight reduction and a low fitting pressure are achieved.

Figure 7:
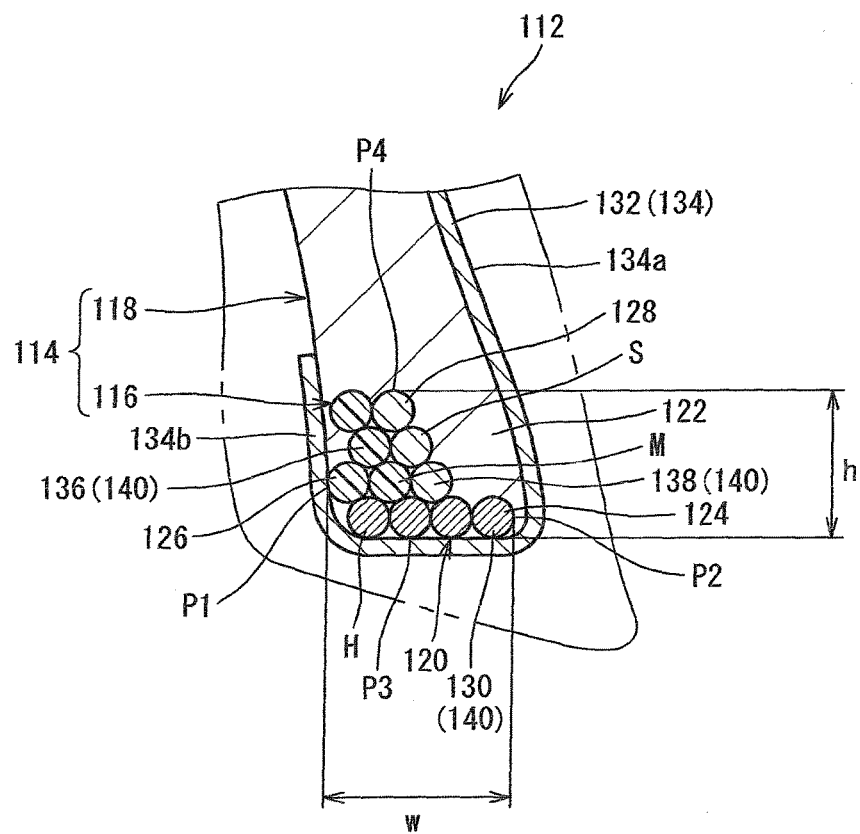
FIG. 7 is an enlarged cross-sectional view showing a portion of a pneumatic tire according to still another embodiment of the present invention.

FIG. 7 shows a portion of a pneumatic tire 112 according to sill another embodiment of the present invention. FIG. 7 shows a bead 114 portion of the tire 112. In FIG. 7, the up-down direction is the radial direction of the tire 112, the right-left direction is the axial direction of the tire 112, and the direction perpendicular to the surface of the sheet is the circumferential direction of the tire 112. FIG. 7 shows a portion of a cross-section of the tire 112 along the radial direction. In FIG. 7, the right side of the surface of the sheet is the inner side in the axial direction, and the left side of the surface of the sheet is the outer side in the axial direction.

In the tire 112, the configuration except for the beads 114 is the same as that of the tire 22 shown in FIG. 1. The tire 112 includes, in addition to the beads 114, a tread, sidewalls, clinches, a carcass, a belt, a band, an inner liner, wings, and cushion layers.

In the tire 112, each bead 114 has a ring shape. Each bead 114 includes a core 116 and an apex 118. The apex 118 extends from the core 116 outward in the radial direction. The apex 118 is tapered outward in the radial direction, which is not shown. The apex 118 is formed from a highly hard crosslinked rubber.

The core 116 of the tire 112 includes a main body 120 and a stretchable portion 122. The core 116 is composed of the main body 120 and the stretchable portion 122. The main body 120 includes a hard unit 124, a middle unit 126, and a soft unit 128.

The hard unit 124 forms an inner portion of the main body 120 of the core 116 in the radial direction. The hard unit 124 includes a hard cord 130 extending in the circumferential direction. When the tire 112 is fitted on a rim, the hard unit 124 serves to tighten the tire 112 on the rim.

In the tire 112, the hard unit 124 is formed by winding the hard cord 130 in the circumferential direction a plurality of times. Accordingly, the hard unit 124 is obtained in which cross-sections of the hard cord 130 are arranged in the axial direction and the radial direction. As shown in the drawing, the number of the cross-sections of the hard cord 130 included in a cross-section of the hard unit 124 is four. The hard unit 124 of the tire 112 is formed by helically winding the hard cord 130 in the circumferential direction four times. The hard unit 124 may be formed by winding, in the circumferential direction, a bundle composed of a plurality of hard cords 130.

In the tire 112, the material of the hard cord 130 is preferably steel. The hard cord 130 is difficult to stretch as compared to one formed from an organic fiber. The hard cord 130 can contribute to tightening the tire 112 on the rim.

In the tire 112, as the hard cord 130, one formed of the single element wire as shown in FIG. 3 is preferable. The hard cord 130 is difficult to stretch as compared to one formed of a plurality of element wires. The hard cord 130 can contribute to tightening the tire 112 on the rim.

In the tire 112, preferably, the material of the hard cord 130 is steel, and the hard cord 130 is formed of an element wire. The stretch of the hard cord 130 is small. In other words, the hard cord 130 is non-stretchable. The non-stretchable hard cord 130 can effectively contribute to tightening the tire 112 on the rim. The hard unit 124 composed of the non-stretchable hard cord 130 can firmly tighten the tire 112 on the rim.

In the tire 112, one cross-section (reference character H in FIG. 7) of the hard cord 130 is located at a portion, at the outer side in the axial direction and at the inner side in the radial direction, of a cross-section of the main body 120 of the core 116. As described above, the hard cord 130 is non-stretchable. The core 116 configured such that the hard cord 130 is located at the portion at the outer side in the axial direction and at the inner side in the radial direction can more firmly tighten the tire 112 on the rim.

In the tire 112, the hard cord 130 only needs to be non-stretchable, and is not limited to the element wire of which the material is steel. One formed from an organic fiber, a glass fiber, or a carbon fiber may be used as the hard cord 130, or one formed from a plurality of element wires may be used as the hard cord 130, as long as it is non-stretchable. Examples of the organic fiber include nylon fibers, polyethylene terephthalate fibers, rayon fibers, polyethylene naphthalate fibers, and aramid fibers.

In the tire 112, in light of tightening force, the outer diameter dh of the hard cord 130 is preferably equal to or greater than 0.5 mm. In light of weight reduction, the outer diameter dh of the hard cord 130 is preferably equal to or less than 10 mm.

The middle unit 126 is located outward of the hard unit 124 in the radial direction. The middle unit 126 is located outward of the soft unit 128 in the axial direction. The middle unit 126 is located between the soft unit 128 and a turned-up portion 134b of a carcass ply 134 that forms a carcass 132, in the axial direction.

The middle unit 126 includes a middle cord 136 extending in the circumferential direction. When the tire 112 is fitted on the rim, the middle unit 126 serves to tighten the tire 112 on the rim.

In the tire 112, the middle unit 126 is formed by winding the middle cord 136 in the circumferential direction a plurality of times. Accordingly, the middle unit 126 is obtained in which cross-sections of the middle cord 136 are arranged in the axial direction and the radial direction. As shown in the drawing, the number of the cross-sections of the middle cord 136 included in a cross-section of the middle unit 126 is four. The middle unit 126 of the tire 112 is formed by helically winding the middle cord 136 in the circumferential direction four times. The middle unit 126 may be formed by winding, in the circumferential direction, a bundle composed of a plurality of middle cords 136.

The middle cord 136 stretches more easily than the above-described hard cord 130. The elongation of the middle cord 136 is greater than the elongation of the hard cord 130. Thus, when the tire 112 is fitted onto the rim, the middle unit 126 composed of the middle cord 136 does not inhibit deformation of the core 116. Since the core 116 easily deforms, the bead 114 portion of the tire 112 easily passes over a hump of the rim. According to the present invention, the tire 112 can be fitted onto the rim at a low fitting pressure. Fitting the tire 112 onto the rim is easy. In addition, due to a synergistic effect of the hard unit 124 and the middle unit 126, the core 116 can more firmly tighten the tire 112 on the rim. With the tire 112, a low fitting pressure is achieved without impairing the tightening force.

Examples of the middle cord 136 in the tire 112 include those having the configurations shown in (a) to (d) of FIG. 5 described above. The middle cord 136 only needs to have an elongation greater than the elongation of the hard cord 130, and is not limited to one formed by twisting together a plurality of element wires of each of which the material is steel. A raw yarn formed from an organic fiber, a glass fiber, or a carbon fiber may be used as the middle cord 136, or one formed by twisting together a plurality of the raw yarns may be used as the middle cord 136, as long as it stretches more easily than the hard cord 130. Examples of the organic fiber include nylon fibers, polyethylene terephthalate fibers, rayon fibers, polyethylene naphthalate fibers, and aramid fibers.

In the tire 112, in light of tightening force, the outer diameter dm of the middle cord 136 is preferably equal to or greater than 0.5 mm. In light of weight reduction, the outer diameter dm of the middle cord 136 is preferably equal to or less than 30 mm.

The soft unit 128 is located outward of the hard unit 124 in the radial direction. The soft unit 128 is located inward of the middle unit 126 in the axial direction. The soft unit 128 is located between the middle unit 126 and the stretchable portion 122 in the axial direction.

The soft unit 128 includes a soft cord 138 extending in the circumferential direction. When the tire 112 is fitted on the rim, the soft unit 128 serves to tighten the tire 112 on the rim.

In the tire 112, the soft unit 128 is formed by winding the soft cord 138 in the circumferential direction a plurality of times. Accordingly, the soft unit 128 is obtained in which cross-sections of the soft cord 138 are arranged in the axial direction and the radial direction. As shown in the drawing, the number of the cross-sections of the soft cord 138 included in a cross-section of the soft unit 128 is three. The soft unit 128 of the tire 112 is formed by helically winding the soft cord 138 in the circumferential direction three times. The soft unit 128 may be formed by winding, in the circumferential direction, a bundle composed of a plurality of soft cords 138.

The soft cord 138 stretches more easily than the above-described hard cord 130. The elongation of the soft cord 138 is greater than the elongation of the hard cord 130. The soft cord 138 stretches more easily than the above-described middle cord 136. The elongation of the soft cord 138 is greater than the elongation of the middle cord 136. Thus, when the tire 112 is fitted onto the rim, the soft unit 128 composed of the soft cord 138 does not inhibit deformation of the core 116. Since the core 116 easily deforms, the bead 114 portion of the tire 112 easily passes over the hump of the rim. According to the present invention, the tire 112 can be fitted onto the rim at a low fitting pressure. Fitting the tire 112 onto the rim is easy. In addition, due to a synergistic effect of the hard unit 124, the middle unit 126, and the soft unit 128, the core 116 can more firmly tighten the tire 112 on the rim. With the tire 112, a low fitting pressure is achieved without impairing the tightening force.

Examples of the soft cord 138 in the tire 112 include those having the configurations shown in (a) to (d) of FIG. 5 described above. The soft cord 138 only needs to have an elongation greater than the elongation of the middle cord 136, and is not limited to one formed by twisting together a plurality of element wires of each of which the material is steel. A raw yarn formed from an organic fiber, a glass fiber, or a carbon fiber may be used as the soft cord 138, or one formed by twisting together a plurality of the raw yarns may be used as the soft cord 138, as long as it stretches more easily than the middle cord 136. Examples of the organic fiber include nylon fibers, polyethylene terephthalate fibers, rayon fibers, polyethylene naphthalate fibers, and aramid fibers.

In the tire 112, in light of tightening force, the outer diameter ds of the soft cord 138 is preferably equal to or greater than 0.5 mm. In light of weight reduction, the outer diameter ds of the soft cord 138 is preferably equal to or less than 30 mm.

In the tire 112, in the cross-section of the main body 120 of the core 116, one cross-section (reference character M in FIG. 7) of the middle cord 136 is located outward of the one cross-section H of the hard cord 130 in the radial direction and inward of the one cross-section H of the hard cord 130 in the axial direction, and one cross-section (reference character S in FIG. 7) of the soft cord 138 is located outward of the one cross-section M of the middle cord 136 in the radial direction and inward of the one cross-section M of the middle cord 136 in the axial direction. The main body 120 is configured such that the elongation of a cord 140 that forms the main body 120 gradually increases from a portion of the cross-section thereof at the outer side in the axial direction and at the inner side in the radial direction toward a portion of the cross-section thereof at the inner side in the axial direction and at the outer side in the radial direction. The main body 120 can effectively contribute to achievement of a low fitting pressure without impairing the tightening force.

An elongation EH at specific load (hereinafter, elongation EH) of the hard cord 130, an elongation EM at specific load (hereinafter, elongation EM) of the middle cord 136, and an elongation ES at specific load (hereinafter, elongation ES) of the soft cord 138 influence the tightening force and the fitting pressure.

In the tire 112, in light of reduction of the fitting pressure, the ratio of the elongation ES relative to the elongation EH is preferably equal to or greater than 101%, more preferably equal to or greater than 102%, further preferably equal to or greater than 104%, and particularly preferably equal to or greater than 108%. In light of maintenance of the tightening force, the ratio is preferably equal to or less than 200%.

In the tire 112, in light of reduction of the fitting pressure, the ratio of the elongation EM relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 112, in light of reduction of the fitting pressure, the ratio of the elongation ES relative to the elongation EM is preferably equal to or greater than 101%, more preferably equal to or greater than 102%, and particularly preferably equal to or greater than 104%. In light of maintenance of the tightening force, the ratio is preferably equal to or less than 200%.

The stretchable portion 122 is located inward of the main body 120 in the axial direction. The stretchable portion 122 is located outward, in the axial direction, of a main portion 134a of the carcass ply 134 that forms the carcass 132. The stretchable portion 122 is located between the main body 120 and the main portion 134a in the axial direction.

The stretchable portion 122 of the tire 112 is composed of a portion of the apex 118. Therefore, the stretchable portion 122 is formed from a crosslinked rubber. The stretchable portion 122 can stretch. As described above, the hard cord 130 that forms a portion of the main body 120 of the core 116, is non-stretchable. The stretchable portion 122 stretches more easily than the hard cord 130.

As described above, the stretchable portion 122 of the tire 112 is composed of the portion of the apex 118. Therefore, the stretchable portion 122 is formed from a rubber composition that is the same as a rubber composition that forms the apex 118. The stretchable portion 122 may be formed from a rubber composition that is different from the rubber composition that forms the apex 118.

In the tire 112, a portion, at the inner side in the axial direction and at the outer side in the radial direction, of a cross-section of the core 116 is composed of the stretchable portion 122. In the tire 112, the stretchable portion 122 is located at the portion in the core 8 of the conventional tire 2 in which portion the cord 12 is present and to which portion great tension is applied when the tire 2 is fitted onto the rim. As described above, the stretchable portion 122 stretches more easily than the hard cord 130. Thus, deformation of the core 116 is easy as compared to the conventional core 8 that does not include the stretchable portion 122. When the tire 112 is fitted onto the rim, the bead 114 portion of the tire 112 easily passes over the hump of the rim. The fitting pressure of the tire 112 is low. Fitting the tire 112 onto the rim is easy. In addition, the main body 120 of the core 116 contributes to a tightening force. Thus, with the tire 112, a low fitting pressure is achieved without impairing the tightening force.

In the tire 112, the stretchable portion 122 has a size with which at least one cross-section of the hard cord 130 can be included therein in a cross-section of the bead 114. In the tire 112, the portion at which the cord 12 is wound in the conventional tire 2 is replaced with the stretchable portion 122 that is formed from the crosslinked rubber. This replacement can contribute to weight reduction of the tire 112. In addition, the stretchable portion 122 can contribute to reduction of the fitting pressure, and the main body 120 can contribute to the tightening force. With the tire 112, while the weight of the tire 112 is reduced, a low fitting pressure can be achieved without impairing the tightening force.

In the tire 112, the width (a double-headed arrow w in FIG. 7) of the core 116 in the axial direction is equal to or greater than 1 mm and equal to or less than 50 mm. The height (a double-headed arrow h in FIG. 7) of the core 116 in the radial direction is equal to or greater than 1 mm and equal to or less than 50 mm. The width w is represented by the length in the axial direction from the outer edge (reference character P1 in FIG. 7) of the core 116 in the axial direction to the inner edge (reference character P2 in FIG. 7) of the core 116 in the axial direction. The height h is represented by the length in the radial direction from the inner edge (reference character P3 in FIG. 7) of the core 116 in the radial direction to the outer edge (reference character P4 in FIG. 7) of the core 116 in the radial direction.

In the tire 112, the ratio of the sum (HA+MA+SA) of the total sum HA of the areas of the cross-sections of the hard cord 130 included in the cross-section of the hard unit 124 of the core 116, the total sum MA of the areas of the cross-sections of the middle cord 136 included in the cross-section of the middle unit 126 of the core 116, and the total sum SA of the areas of the cross-sections of the soft cord 138 included in the cross-section of the soft unit 128 of the core 116, relative to the area BA of the cross-section of the core 116, is preferably equal to or greater than 15% and equal to or less than 95%. When this ratio is set so as to be equal to or greater than 15%, an appropriate tightening force is obtained. When this ratio is set so as to be equal to or less than 95%, the stretchable portion 122 is sufficiently ensured, and thus weight reduction and a low fitting pressure are achieved. The area BA of the cross-section of the core 116 is represented by the product of the above-described width w in the axial direction and the above-described height h in the radial direction.

In the tire 112, the ratio of the total sum HA of the areas of the cross-sections of the hard cord 130 included in the cross-section of the hard unit 124, relative to the area BA of the cross-section of the core 116, is preferably equal to or greater than 7% and equal to or less than 87%. When this ratio is set so as to be equal to or greater than 7%, an appropriate tightening force is obtained. When this ratio is set so as to be equal to or less than 87%, weight reduction and a low fitting pressure are achieved.

In the tire 112, the ratio of the total sum MA of the areas of the cross-sections of the middle cord 136 included in the cross-section of the middle unit 126, relative to the area BA of the cross-section of the core 116, is preferably equal to or greater than 5% and equal to or less than 80%. When this ratio is set so as to be equal to or greater than 5%, an appropriate tightening force is obtained. When this ratio is set so as to be equal to or less than 80%, weight reduction and a low fitting pressure are achieved.

In the tire 112, the ratio of the total sum SA of the areas of the cross-sections of the soft cord 138 included in the cross-section of the soft unit 128, relative to the area BA of the cross-section of the core 116, is preferably equal to or greater than 3% and equal to or less than 70%. When this ratio is set so as to be equal to or greater than 3%, an appropriate tightening force is obtained. When this ratio is set so as to be equal to or less than 70%, weight reduction and a low fitting pressure are achieved.

Figure 8:
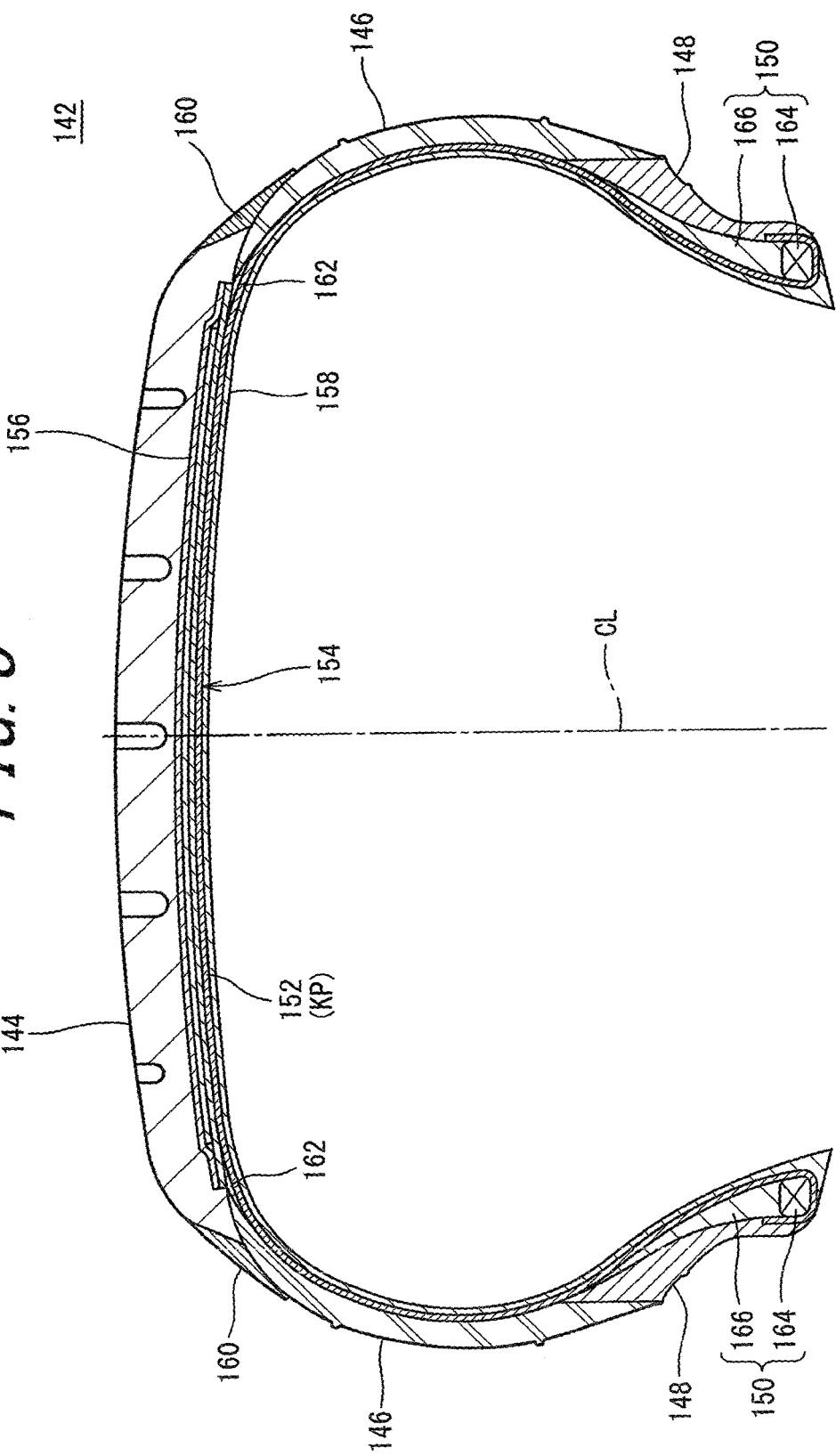
FIG. 8 is a cross-sectional view showing a portion of a pneumatic tire according to still another embodiment of the present invention.

FIG. 8 shows a pneumatic tire 142 according to still another embodiment of the present invention. In FIG. 8, the up-down direction is the radial direction of the tire 142, the right-left direction is the axial direction of the tire 142, and the direction perpendicular to the surface of the sheet is the circumferential direction of the tire 142. In FIG. 8, an alternate long and short dash line CL represents the equator plane of the tire 142. The shape of the tire 142 is symmetrical about the equator plane except for a tread pattern. FIG. 8 shows a cross-section of the tire 142 along the radial direction.

The tire 142 includes a tread 144, sidewalls 146, clinches 148, beads 150, a carcass 152, a belt 154, a band 156, an inner liner 158, wings 160, and cushion layers 162. The tire 142 is of a tubeless type. The tire 142 is mounted on a passenger car. The tire 142 has the same configuration as that of the tire 22 shown in FIG. 1, except for the beads 150 of the tire 142.

The beads 150 are located inward of the clinches 148 in the axial direction. Each bead 150 has a ring shape. Each bead 150 includes a core 164 and an apex 166. The apex 166 extends from the core 164 outward in the radial direction. The apex 166 is tapered outward in the radial direction. The apex 166 is formed from a highly hard crosslinked rubber. In the drawing, reference character KP indicates a carcass ply that forms the carcass 152. The carcass ply KP is turned up around the core 164 from the inner side to the outer side in the axial direction.

Figure 9:
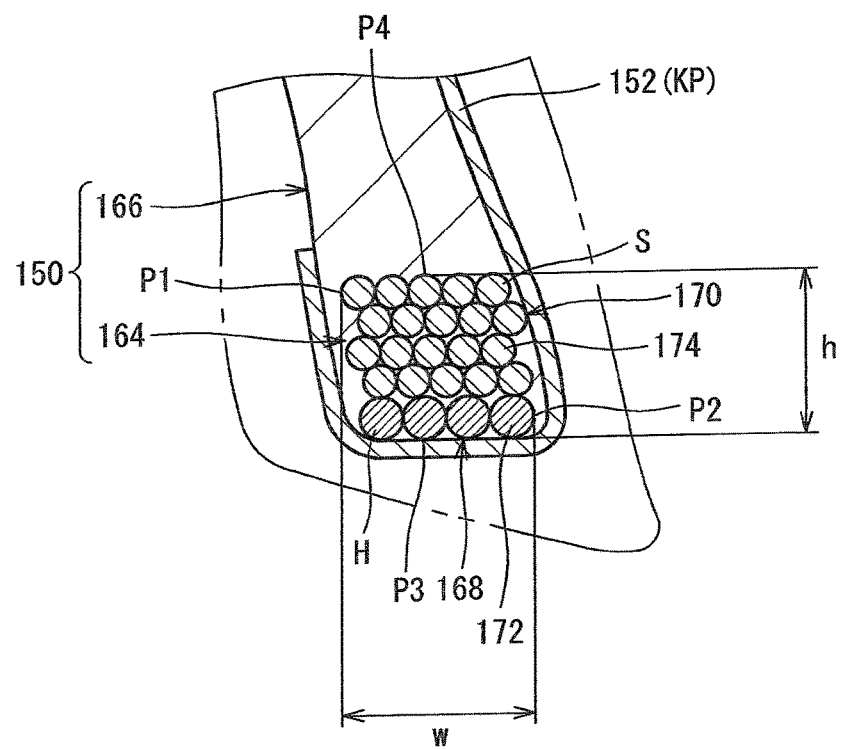
FIG. 9 is an enlarged cross-sectional view showing a portion of the tire in FIG. 8.

FIG. 9 shows a cross-section of the core 164 that forms a portion of the bead 150. In FIG. 9, the up-down direction is the radial direction of the tire 142, the right-left direction is the axial direction of the tire 142, and the direction perpendicular to the surface of the sheet is the circumferential direction of the tire 142. In FIG. 9, the right side of the surface of the sheet is the inner side in the axial direction, and the left side of the surface of the sheet is the outer side in the axial direction. FIG. 9 shows a cross-section of the tire 142 along the radial direction.

The core 164 includes a hard unit 168 and a soft unit 170. The core 164 of the tire 142 is composed of the hard unit 168 and the soft unit 170.

The hard unit 168 forms an inner portion of the core 164 in the radial direction. The hard unit 168 includes a hard cord 172 extending in the circumferential direction. When the tire 142 is fitted on a rim, the hard unit 168 serves to tighten the tire 142 on the rim.

In the tire 142, the hard unit 168 is formed by winding the hard cord 172 in the circumferential direction a plurality of times. Accordingly, the hard unit 168 is obtained in which cross-sections of the hard cord 172 are arranged in the axial direction and the radial direction. As shown in the drawing, the number of the cross-sections of the hard cord 172 included in a cross-section of the hard unit 168 is four. The hard unit 168 of the tire 142 is formed by helically winding the hard cord 172 in the circumferential direction four times. The hard unit 168 may be formed by winding, in the circumferential direction, a bundle composed of a plurality of hard cords 172.

In the tire 142, the material of the hard cord 172 is preferably steel. The hard cord 172 is difficult to stretch as compared to one formed from an organic fiber. The hard cord 172 can contribute to tightening the tire 142 on the rim.

In the tire 142, as the hard cord 172, one formed of the single element wire as shown in FIG. 3 is preferable. The hard cord 172 is difficult to stretch as compared to one formed of a plurality of element wires. The hard cord 172 can contribute to tightening the tire 142 on the rim.

In the tire 142, preferably, the material of the hard cord 172 is steel, and the hard cord 172 is formed of an element wire. The stretch of the hard cord 172 is small. In other words, the hard cord 172 is non-stretchable. The non-stretchable hard cord 172 can effectively contribute to tightening the tire 142 on the rim. The hard unit 168 composed of the non-stretchable hard cord 172 can firmly tighten the tire 142 on the rim.

In the tire 142, one cross-section (reference character H in FIG. 9) of the hard cord 172 is located at a portion, at the outer side in the axial direction and at the inner side in the radial direction, of a cross-section of the core 164. As described above, the hard cord 172 is non-stretchable. The core 164 configured such that the hard cord 172 is located at the portion at the outer side in the axial direction and at the inner side in the radial direction can more firmly tighten the tire 142 on the rim.

In the tire 142, the hard cord 172 only needs to be non-stretchable, and is not limited to the element wire of which the material is steel. One formed from an organic fiber, a glass fiber, or a carbon fiber may be used as the hard cord 172, or one formed from a plurality of element wires may be used as the hard cord 172, as long as it is non-stretchable. Examples of the organic fiber include nylon fibers, polyethylene terephthalate fibers, rayon fibers, polyethylene naphthalate fibers, and aramid fibers.

In the tire 142, in light of tightening force, the outer diameter dh of the hard cord 172 is preferably equal to or greater than 0.5 mm. In light of weight reduction, the outer diameter dh of the hard cord 172 is preferably equal to or less than 10 mm.

The soft unit 170 is located outward of the hard unit 168 in the radial direction. The soft unit 170 includes a soft cord 174 extending in the circumferential direction. When the tire 142 is fitted on the rim, the soft unit 170 serves to tighten the tire 142 on the rim.

In the tire 142, the soft unit 170 is formed by winding the soft cord 174 in the circumferential direction a plurality of times. Accordingly, the soft unit 170 is obtained in which cross-sections of the soft cord 174 are arranged in the axial direction and the radial direction. As shown in the drawing, the number of the cross-sections of the soft cord 174 included in a cross-section of the soft unit 170 is 20. The soft unit 170 of the tire 142 is formed by helically winding the soft cord 174 in the circumferential direction 20 times. The soft unit 170 may be formed by winding, in the circumferential direction, a bundle composed of a plurality of soft cords 174.

The soft cord 174 stretches more easily than the above-described hard cord 172. The elongation of the soft cord 174 is greater than the elongation of the hard cord 172. Thus, when the tire 142 is fitted onto the rim, the soft unit 170 composed of the soft cord 174 does not inhibit deformation of the core 164. Since the core 164 easily deforms, a bead 150 portion of the tire 142 easily passes over a hump of the rim. According to the present invention, the tire 142 can be fitted onto the rim at a low fitting pressure. Fitting the tire 142 onto the rim is easy.

In the tire 142, one cross-section (reference character S in FIG. 9) of the soft cord 174 is located at a portion, at the inner side in the axial direction and at the outer side in the radial direction, of the cross-section of the core 164. This portion corresponds to the portion in the core 8 of the conventional tire 2 to which portion great tension is applied when the tire 2 is fitted onto the rim. Since the soft cord 174 stretches more easily than the hard cord 172, the soft cord 174 located at the portion, at the inner side in the axial direction and at the outer side in the radial direction, of the cross-section of the core 164 can effectively contribute to deformation of the core 164. Since the bead 150 portion of the tire 142 easily passes over the hump of the rim, the tire 142 can be fitted onto the rim at a low fitting pressure. In addition, due to a synergistic effect of the hard unit 168 and the soft unit 170, the core 164 can more firmly tighten the tire 142 on the rim. With the tire 142, a low fitting pressure is achieved without impairing the tightening force.

Examples of the soft cord 174 in the tire 142 include those having the configurations shown in (a) to (d) of FIG. 5 described above. The soft cord 174 only needs to have an elongation greater than the elongation of the hard cord 172, and is not limited to one formed by twisting together a plurality of element wires of each of which the material is steel. A raw yarn formed from an organic fiber, a glass fiber, or a carbon fiber may be used as the soft cord 174, or one formed by twisting together a plurality of the raw yarns may be used as the soft cord 174, as long as it stretches more easily than the hard cord 172. Examples of the organic fiber include nylon fibers, polyethylene terephthalate fibers, rayon fibers, polyethylene naphthalate fibers, and aramid fibers. In light of weight reduction of the tire 142, the soft cord 174 is preferably one formed from an organic fiber.

In the tire 142, in light of tightening force, the outer diameter ds of the soft cord 174 is preferably equal to or greater than 0.5 mm. In light of weight reduction, the outer diameter ds of the soft cord 174 is preferably equal to or less than 30 mm.

In the tire 142, particularly, the one cross-section H of the hard cord 172 is located at the portion, at the outer side in the axial direction and at the inner side in the radial direction, of the cross-section of the core 164, and the one cross-section S of the soft cord 174 is located at the portion, at the inner side in the axial direction and at the outer side in the radial direction, of the cross-section of the core 164. The core 164 in which the hard cord 172 and the soft cord 174 are located as described above can effectively contribute to maintenance of the tightening force and reduction of the fitting pressure. As described later, in the tire 142, an elongation EH at specific load (hereinafter, elongation EH) of the hard cord 172 and an elongation ES at specific load (hereinafter, elongation ES) of the soft cord 174 are appropriately adjusted. Therefore, with the tire 142, a low fitting pressure can be achieved without impairing the tightening force.

The elongation EH of the hard cord 172 and the elongation ES of the soft cord 174 influence the tightening force and the fitting pressure. In the tire 142, in light of reduction of the fitting pressure, the ratio of the elongation. ES relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 142, the width (a double-headed arrow w in FIG. 9) of the core 164 in the axial direction is equal to or greater than 1 mm and equal to or less than 50 mm. The height (a double-headed arrow h in FIG. 9) of the core 164 in the radial direction is equal to or greater than 1 mm and equal to or less than 50 mm. The width w is represented by the length in the axial direction from the outer edge (reference character P1 in FIG. 9) of the core 164 in the axial direction to the inner edge (reference character P2 in FIG. 9) of the core 164 in the axial direction. The height h is represented by the length in the radial direction from the inner edge (reference character P3 in FIG. 9) of the core 164 in the radial direction to the outer edge (reference character P4 in FIG. 9) of the core 164 in the radial direction.

In the tire 142, the ratio of the total sum HA of the areas of the cross-sections of the hard cord 172 included in the cross-section of the hard unit 168 of the core 164, relative to the area BA of the cross-section of the core 164, is preferably equal to or greater than 10% and equal to or less than 95%. When this ratio is set so as to be equal to or greater than 10%, an appropriate tightening force is obtained. When this ratio is set so as to be equal to or less than 90%, weight reduction and a low fitting pressure are achieved. The area BA of the cross-section of the core 164 is represented by the product of the above-described width w in the axial direction and the above-described height h in the radial direction.

In the tire 142, the ratio of the total sum SA of the areas of the cross-sections of the soft cord 174 included in the cross-section of the soft unit 170, relative to the area BA of the cross-section of the core 164, is preferably equal to or greater than 5% and equal to or less than 90%. When this ratio is set so as to be equal to or greater than 5%, an appropriate tightening force is obtained. When this ratio is set so as to be equal to or less than 90%, weight reduction and a low fitting pressure are achieved.

Figure 10:
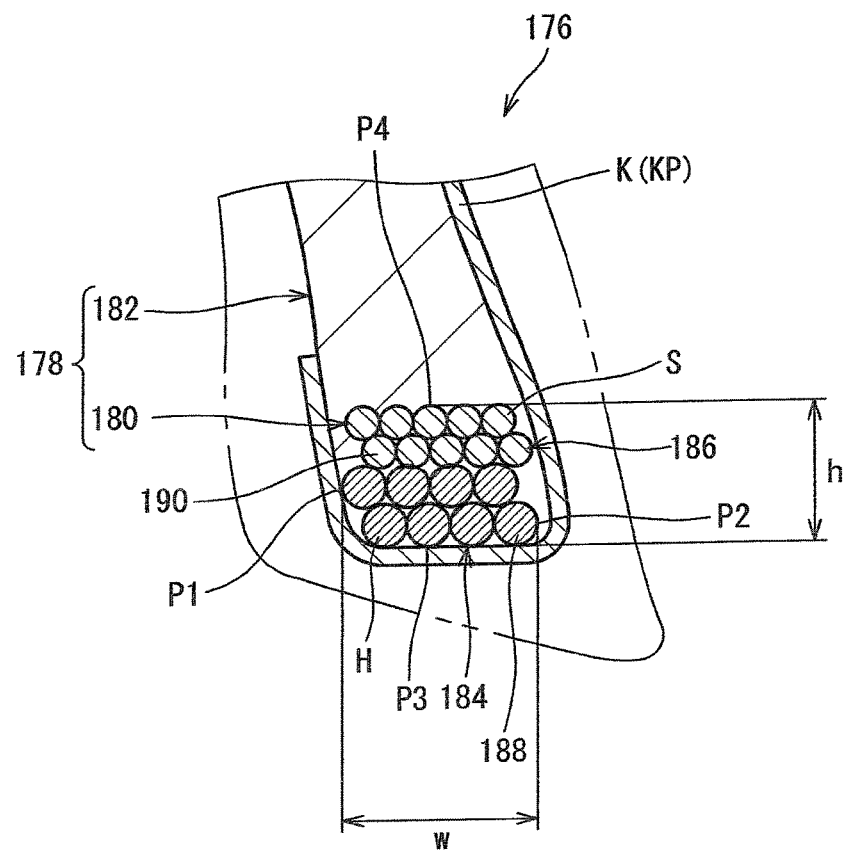
FIG. 10 is an enlarged cross-sectional view showing a portion of a pneumatic tire according to still another embodiment of the present invention.

FIG. 10 shows a portion of a pneumatic tire 176 according to sill another embodiment of the present invention. FIG. 10 shows a bead 178 portion of the tire 176. In FIG. 10, the up-down direction is the radial direction of the tire 176, the right-left direction is the axial direction of the tire 176, and the direction perpendicular to the surface of the sheet is the circumferential direction of the tire 176. FIG. 10 shows a portion of a cross-section of the tire 176 along the radial direction. In FIG. 10, the right side of the surface of the sheet is the inner side in the axial direction, and the left side of the surface of the sheet is the outer side in the axial direction.

In the tire 176, the configuration except for the beads 178 is the same as that of the tire 142 shown in FIG. 8. The configuration except for the beads 178 is also the same as that of the tire 22 shown in FIG. 1. The tire 176 includes, in addition to the beads 178, a tread, sidewalls, clinches, a carcass, a belt, a band, an inner liner, wings, and cushion layers.

Each bead 178 has a ring shape. Each bead 178 includes a core 180 and an apex 182. The apex 182 extends from the core 180 outward in the radial direction. The apex 182 is tapered outward in the radial direction. The apex 182 is formed from a highly hard crosslinked rubber. In the drawing, reference character K indicates the carcass, and reference character KP indicates a carcass ply that forms the carcass K. The carcass ply KP is turned up around the core 180 from the inner side to the outer side in the axial direction.

The core 180 includes a hard unit 184 and a soft unit 186. The core 180 of the tire 176 is composed of the hard unit 184 and the soft unit 186.

The hard unit 184 forms an inner portion of the core 180 in the radial direction. The hard unit 184 includes a hard cord 188 extending in the circumferential direction. When the tire 176 is fitted on a rim, the hard unit 184 serves to tighten the tire 176 on the rim.

In the tire 176, the hard unit 184 is formed by winding the hard cord 188 in the circumferential direction a plurality of times. Accordingly, the hard unit 184 is obtained in which cross-sections of the hard cord 188 are arranged in the axial direction and the radial direction. As shown in the drawing, the number of the cross-sections of the hard cord 188 included in a cross-section of the hard unit 184 is eight. The hard unit 184 of the tire 176 is formed by helically winding the hard cord 188 in the circumferential direction eight times. The hard unit 184 may be formed by winding, in the circumferential direction, a bundle composed of a plurality of hard cords 188.

In the tire 176, the material of the hard cord 188 is preferably steel. The hard cord 188 is difficult to stretch as compared to one formed from an organic fiber. The hard cord 188 can contribute to tightening the tire 176 on the rim.

In the tire 176, as the hard cord 188, one formed of the single element wire as shown in FIG. 3 is preferable. The hard cord 188 is difficult to stretch as compared to one formed of a plurality of element wires. The hard cord 188 can contribute to tightening the tire 176 on the rim.

In the tire 176, preferably, the material of the hard cord 188 is steel, and the hard cord 188 is formed of an element wire. The stretch of the hard cord 188 is small. In other words, the hard cord 188 is non-stretchable. The non-stretchable hard cord 188 can effectively contribute to tightening the tire 176 on the rim. The hard unit 184 composed of the non-stretchable hard cord 188 can firmly tighten the tire 176 on the rim.

In the tire 176, one cross-section (reference character H in FIG. 10) of the hard cord 188 is located at a portion, at the outer side in the axial direction and at the inner side in the radial direction, of a cross-section of the core 180. As described above, the hard cord 188 is non-stretchable. The core 180 configured such that the hard cord 188 is located at the portion at the outer side in the axial direction and at the inner side in the radial direction can more firmly tighten the tire 176 on the rim.

In the tire 176, the hard cord 188 only needs to have non-stretchability, and is not limited to the element wire of which the material is steel. One formed from an organic fiber, a glass fiber, or a carbon fiber may be used as the hard cord 188, or one formed from a plurality of element wires may be used as the hard cord 188, as long as it is non-stretchable. Examples of the organic fiber include nylon fibers, polyethylene terephthalate fibers, rayon fibers, polyethylene naphthalate fibers, and aramid fibers.

In the tire 176, in light of tightening force, the outer diameter dh of the hard cord 188 is preferably equal to or greater than 0.5 mm. In light of weight reduction, the outer diameter dh of the hard cord 188 is preferably equal to or less than 10 mm.

The soft unit 186 is located outward of the hard unit 184 in the radial direction. The soft unit 186 includes a soft cord 190 extending in the circumferential direction. When the tire 176 is fitted on the rim, the soft unit 186 serves to tighten the tire 176 on the rim.

In the tire 176, the soft unit 186 is formed by winding the soft cord 190 in the circumferential direction a plurality of times. Accordingly, the soft unit 186 is obtained in which cross-sections of the soft cord 190 are arranged in the axial direction and the radial direction. As shown in the drawing, the number of the cross-sections of the soft cord 190 included in a cross-section of the soft unit 186 is 10. The soft unit 186 of the tire 176 is formed by helically winding the soft cord 190 in the circumferential direction 10 times. The soft unit 186 may be formed by winding, in the circumferential direction, a bundle composed of a plurality of soft cords 190.

The soft cord 190 stretches more easily than the above-described hard cord 188. The elongation of the soft cord 190 is greater than the elongation of the hard cord 188. Thus, when the tire 176 is fitted onto the rim, the soft unit 186 composed of the soft cord 190 does not inhibit deformation of the core 180. Since the core 180 easily deforms, the bead 178 portion of the tire 176 easily passes over a hump of the rim. According to the present invention, the tire 176 can be fitted onto the rim at a low fitting pressure. Fitting the tire 176 onto the rim is easy.

In the tire 176, one cross-section (reference character S in FIG. 10) of the soft cord 190 is located at a portion, at the inner side in the axial direction and at the outer side in the radial direction, of the cross-section of the core 180. This portion corresponds to the portion in the core 8 of the conventional tire 2 to which portion great tension is applied when the tire 2 is fitted onto the rim. Since the soft cord 190 stretches more easily than the hard cord 188, the soft cord 190 located at the portion, at the inner side in the axial direction and at the outer side in the radial direction, of the cross-section of the core 180 can effectively contribute to deformation of the core 180. Since the bead 178 portion of the tire 176 easily passes over the hump of the rim, the tire 176 can be fitted onto the rim at a low fitting pressure. In addition, due to a synergistic effect of the hard unit 184 and the soft unit 186, the core 180 can more firmly tighten the tire 176 on the rim. With the tire 176, a low fitting pressure is achieved without impairing the tightening force.

Examples of the soft cord 190 in the tire 176 include those having the configurations shown in (a) to (d) of FIG. 5 described above. The soft cord 190 only needs to have an elongation greater than the elongation of the hard cord 188, and is not limited to one formed by twisting together a plurality of element wires of each of which the material is steel. A raw yarn formed from an organic fiber, a glass fiber, or a carbon fiber may be used as the soft cord 190, or one formed by twisting together a plurality of the raw yarns may be used as the soft cord 190, as long as it stretches more easily than the hard cord 188. Examples of the organic fiber include nylon fibers, polyethylene terephthalate fibers, rayon fibers, polyethylene naphthalate fibers, and aramid fibers. In light of weight reduction of the tire 176, the soft cord 190 is preferably one formed from an organic fiber.

In the tire 176, in light of tightening force, the outer diameter ds of the soft cord 190 is preferably equal to or greater than 0.5 mm. In light of weight reduction, the outer diameter ds of the soft cord 190 is preferably equal to or less than 30 mm.

In the tire 176, particularly, the one cross-section H of the hard cord 188 is located at the portion, at the outer side in the axial direction and at the inner side in the radial direction, of the cross-section of the core 180, and the one cross-section S of the soft cord 190 is located at the portion, at the inner side in the axial direction and at the outer side in the radial direction, of the cross-section of the core 180. The core 180 in which the hard cord 188 and the soft cord 190 are located as described above can effectively contribute to maintenance of the tightening force and reduction of the fitting pressure. As described later, in the tire 176, an elongation EH at specific load (hereinafter, elongation EH) of the hard cord 188 and an elongation ES at specific load (hereinafter, elongation ES) of the soft cord 190 are appropriately adjusted. Therefore, with the tire 176, a low fitting pressure can be achieved without impairing the tightening force.

The elongation EH of the hard cord 188 and the elongation ES of the soft cord 190 influence the tightening force and the fitting pressure. In the tire 176, in light of reduction of the fitting pressure, the ratio of the elongation ES relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 176, the width (a double-headed arrow w in FIG. 10) of the core 180 in the axial direction is equal to or greater than 1 mm and equal to or less than 50 mm. The height (a double-headed arrow h in FIG. 10) of the core 180 in the radial direction is equal to or greater than 1 mm and equal to or less than 50 mm. The width w is represented by the length in the axial direction from the outer edge (reference character P1 in FIG. 10) of the core 180 in the axial direction to the inner edge (reference character P2 in FIG. 10) of the core 180 in the axial direction. The height h is represented by the length in the radial direction from the inner edge (reference character P3 in FIG. 10) of the core 180 in the radial direction to the outer edge (reference character P4 in FIG. 10) of the core 180 in the radial direction.

In the tire 176, the ratio of the total sum HA of the areas of the cross-sections of the hard cord 188 included in the cross-section of the hard unit 184 of the core 180, relative to the area BA of the cross-section of the core 180, is preferably equal to or greater than 20% and equal to or less than 95%. When this ratio is set so as to be equal to or greater than 20%, an appropriate tightening force is obtained. When this ratio is set so as to be equal to or less than 95%, weight reduction and a low fitting pressure are achieved. The area BA of the cross-section of the core 180 is represented by the product of the above-described width w in the axial direction and the above-described height h in the radial direction.

In the tire 176, the ratio of the total sum SA of the areas of the cross-sections of the soft cord 190 included in the cross-section of the soft unit 186, relative to the area BA of the cross-section of the core 180, is preferably equal to or greater than 5% and equal to or less than 80%. When this ratio is set so as to be equal to or greater than 5%, an appropriate tightening force is obtained. When this ratio is set so as to be equal to or less than 80%, weight reduction and a low fitting pressure are achieved.

Figure 11:
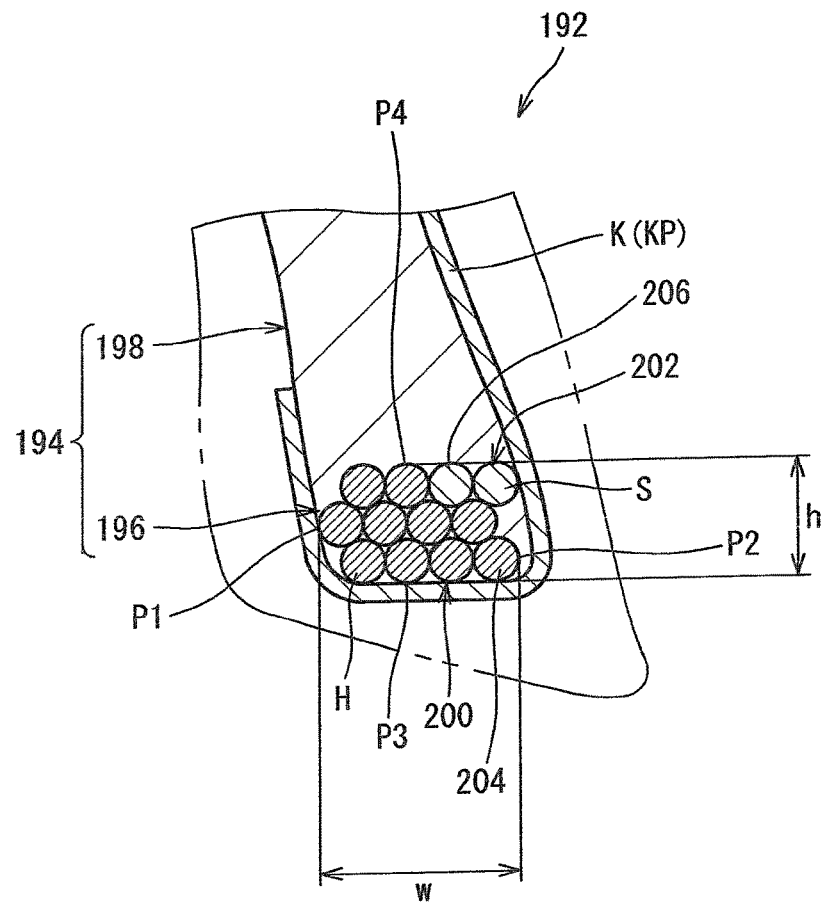
FIG. 11 is an enlarged cross-sectional view showing a portion of a pneumatic tire according to still another embodiment of the present invention.

FIG. 11 shows a portion of a pneumatic tire 192 according to sill another embodiment of the present invention. FIG. 11 shows a bead 194 portion of the tire 192. In FIG. 11, the up-down direction is the radial direction of the tire 192, the right-left direction is the axial direction of the tire 192, and the direction perpendicular to the surface of the sheet is the circumferential direction of the tire 192. FIG. 11 shows a portion of a cross-section of the tire 192 along the radial direction. In FIG. 11, the right side of the surface of the sheet is the inner side in the axial direction, and the left side of the surface of the sheet is the outer side in the axial direction.

In the tire 192, the configuration except for the beads 194 is the same as that of the tire 142 shown in FIG. 8. The configuration except for the beads 194 is also the same as that of the tire 22 shown in FIG. 1. The tire 192 includes, in addition to the beads 194, a tread, sidewalls, clinches, a carcass, a belt, a band, an inner liner, wings, and cushion layers.

Each bead 194 has a ring shape. Each bead 194 includes a core 196 and an apex 198. The apex 198 extends from the core 196 outward in the radial direction. The apex 198 is tapered outward in the radial direction. The apex 198 is formed from a highly hard crosslinked rubber. In the drawing, reference character K indicates the carcass, and reference character KP indicates a carcass ply that forms the carcass K. The carcass ply KP is turned up around the core 196 from the inner side to the outer side in the axial direction.

The core 196 includes a hard unit 200 and a soft unit 202. The core 196 of the tire 192 is composed of the hard unit 200 and the soft unit 202.

The hard unit 200 forms an inner portion of the core 196 in the radial direction. The hard unit 200 includes a hard cord 204 extending in the circumferential direction. When the tire 192 is fitted on a rim, the hard unit 200 serves to tighten the tire 192 on the rim.

In the tire 192, the hard unit 200 is formed by winding the hard cord 204 in the circumferential direction a plurality of times. Accordingly, the hard unit 200 is obtained in which cross-sections of the hard cord 204 are arranged in the axial direction and the radial direction. As shown in the drawing, the number of the cross-sections of the hard cord 204 included in a cross-section of the hard unit 200 is 10. The hard unit 200 of the tire 192 is formed by helically winding the hard cord 204 in the circumferential direction 10 times. The hard unit 200 may be formed by winding, in the circumferential direction, a bundle composed of a plurality of hard cords 204.

In the tire 192, the material of the hard cord 204 is preferably steel. The hard cord 204 is difficult to stretch as compared to one formed from an organic fiber. The hard cord 204 can contribute to tightening the tire 192 on the rim.

In the tire 192, as the hard cord 204, one formed of the single element wire as shown in FIG. 3 is preferable. The hard cord 204 is difficult to stretch as compared to one formed of a plurality of element wires. The hard cord 204 can contribute to tightening the tire 192 on the rim.

In the tire 192, preferably, the material of the hard cord 204 is steel, and the hard cord 204 is formed of an element wire. The stretch of the hard cord 204 is small. In other words, the hard cord 204 is non-stretchable. The non-stretchable hard cord 204 can effectively contribute to tightening the tire 192 on the rim. The hard unit 200 composed of the non-stretchable hard cord 204 can firmly tighten the tire 192 on the rim.

In the tire 192, one cross-section (reference character H in FIG. 11) of the hard cord 204 is located at a portion, at the outer side in the axial direction and at the inner side in the radial direction, of a cross-section of the core 196. As described above, the hard cord 204 is non-stretchable. The core 196 configured such that the hard cord 204 is located at the portion at the outer side in the axial direction and at the inner side in the radial direction can more firmly tighten the tire 192 on the rim.

In the tire 192, the hard cord 204 only needs to be non-stretchable, and is not limited to the element wire of which the material is steel. One formed from an organic fiber, a glass fiber, or a carbon fiber may be used as the hard cord 204, or one formed from a plurality of element wires may be used as the hard cord 204, as long as it is non-stretchable. Examples of the organic fiber include nylon fibers, polyethylene terephthalate fibers, rayon fibers, polyethylene naphthalate fibers, and aramid fibers.

In the tire 192, in light of tightening force, the outer diameter dh of the hard cord 204 is preferably equal to or greater than 0.5 mm. In light of weight reduction, the outer diameter dh of the hard cord 204 is preferably equal to or less than 10 mm.

The soft unit 202 is located outward of the hard unit 200 in the radial direction. The soft unit 202 includes a soft cord 206 extending in the circumferential direction. When the tire 192 is fitted on the rim, the soft unit 202 serves to tighten the tire 192 on the rim.

In the tire 192, the soft unit 202 is formed by winding the soft cord 206 in the circumferential direction a plurality of times. Accordingly, the soft unit 202 is obtained in which cross-sections of the soft cord 206 are arranged in the axial direction and the radial direction. As shown in the drawing, the number of the cross-sections of the soft cord 206 included in a cross-section of the soft unit 202 is two. The soft unit 202 of the tire 192 is formed by helically winding the soft cord 206 in the circumferential direction twice. The soft unit 202 may be formed by winding, in the circumferential direction, a bundle composed of two soft cords 206.

The soft cord 206 stretches more easily than the above-described hard cord 204. The elongation of the soft cord 206 is greater than the elongation of the hard cord 204. Thus, when the tire 192 is fitted onto the rim, the soft unit 202 composed of the soft cord 206 does not inhibit deformation of the core 196. Since the core 196 easily deforms, the bead 194 portion of the tire 192 easily passes over a hump of the rim. According to the present invention, the tire 192 can be fitted onto the rim at a low fitting pressure. Fitting the tire 192 onto the rim is easy.

In the tire 192, one cross-section (reference character S in FIG. 11) of the soft cord 206 is located at a portion, at the inner side in the axial direction and at the outer side in the radial direction, of the cross-section of the core 196. This portion corresponds to the portion in the core 8 of the conventional tire 2 to which portion great tension is applied when the tire 2 is fitted onto the rim. Since the soft cord 206 stretches more easily than the hard cord 204, the soft cord 206 located at the portion, at the inner side in the axial direction and at the outer side in the radial direction, of the cross-section of the core 196 can effectively contribute to deformation of the core 196. Since the bead 194 portion of the tire 192 easily passes over the hump of the rim, the tire 192 can be fitted onto the rim at a low fitting pressure. In addition, due to a synergistic effect of the hard unit 200 and the soft unit 202, the core 196 can more firmly tighten the tire 192 on the rim. With the tire 192, a low fitting pressure is achieved without impairing the tightening force.

Examples of the soft cord 206 in the tire 192 include those having the configurations shown in (a) to (d) of FIG. 5 described above. The soft cord 206 only needs to have an elongation greater than the elongation of the hard cord 204, and is not limited to one formed by twisting together a plurality of element wires of each of which the material is steel. A raw yarn formed from an organic fiber, a glass fiber, or a carbon fiber may be used as the soft cord 206, or one formed by twisting together a plurality of the raw yarns may be used as the soft cord 206, as long as it stretches more easily than the hard cord 204. Examples of the organic fiber include nylon fibers, polyethylene terephthalate fibers, rayon fibers, polyethylene naphthalate fibers, and aramid fibers. In light of weight reduction of the tire 192, the soft cord 206 is preferably one formed from an organic fiber.

In the tire 192, in light of tightening force, the outer diameter ds of the soft cord 206 is preferably equal to or greater than 0.5 mm. In light of weight reduction, the outer diameter ds of the soft cord 206 is preferably equal to or less than 30 mm.

In the tire 192, particularly, the one cross-section H of the hard cord 204 is located at the portion, at the outer side in the axial direction and at the inner side in the radial direction, of the cross-section of the core 196, and the one cross-section S of the soft cord 206 is located at the portion, at the inner side in the axial direction and at the outer side in the radial direction, of the cross-section of the core 196. The core 196 in which the hard cord 204 and the soft cord 206 are located as described above can effectively contribute to maintenance of the tightening force and reduction of the fitting pressure. As described later, in the tire 192, an elongation EH at specific load (hereinafter, elongation EH) of the hard cord 204 and an elongation ES at specific load (hereinafter, elongation ES) of the soft cord 206 are appropriately adjusted. Therefore, with the tire 192, a low fitting pressure can be achieved without impairing the tightening force.

The elongation EH of the hard cord 204 and the elongation ES of the soft cord 206 influence the tightening force and the fitting pressure. In the tire 192, in light of reduction of the fitting pressure, the ratio of the elongation ES relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 192, the width (a double-headed arrow w in FIG. 11) of the core 196 in the axial direction is equal to or greater than 1 mm and equal to or less than 50 mm. The height (a double-headed arrow h in FIG. 11) of the core 196 in the radial direction is equal to or greater than 1 mm and equal to or less than 50 mm. The width w is represented by the length in the axial direction from the outer edge (reference character P1 in FIG. 11) of the core 196 in the axial direction to the inner edge (reference character P2 in FIG. 11) of the core 196 in the axial direction. The height h is represented by the length in the radial direction from the inner edge (reference character P3 in FIG. 11) of the core 196 in the radial direction to the outer edge (reference character P4 in FIG. 11) of the core 196 in the radial direction.

In the tire 192, the ratio of the total sum HA of the areas of the cross-sections of the hard cord 204 included in the cross-section of the hard unit 200 of the core 196, relative to the area BA of the cross-section of the core 196, is preferably equal to or greater than 20% and equal to or less than 95%. When this ratio is set so as to be equal to or greater than 20%, an appropriate tightening force is obtained. When this ratio is set so as to be equal to or less than 95%, weight reduction and a low fitting pressure are achieved. The area BA of the cross-section of the core 196 is represented by the product of the above-described width w in the axial direction and the above-described height h in the radial direction.

In the tire 192, the ratio of the total sum SA of the areas of the cross-sections of the soft cord 206 included in the cross-section of the soft unit 202, relative to the area BA of the cross-section of the core 196, is preferably equal to or greater than 5% and equal to or less than 80%. When this ratio is set so as to be equal to or greater than 5%, an appropriate tightening force is obtained. When this ratio is set so as to be equal to or less than 80%, weight reduction and a low fitting pressure are achieved.

Figure 12:
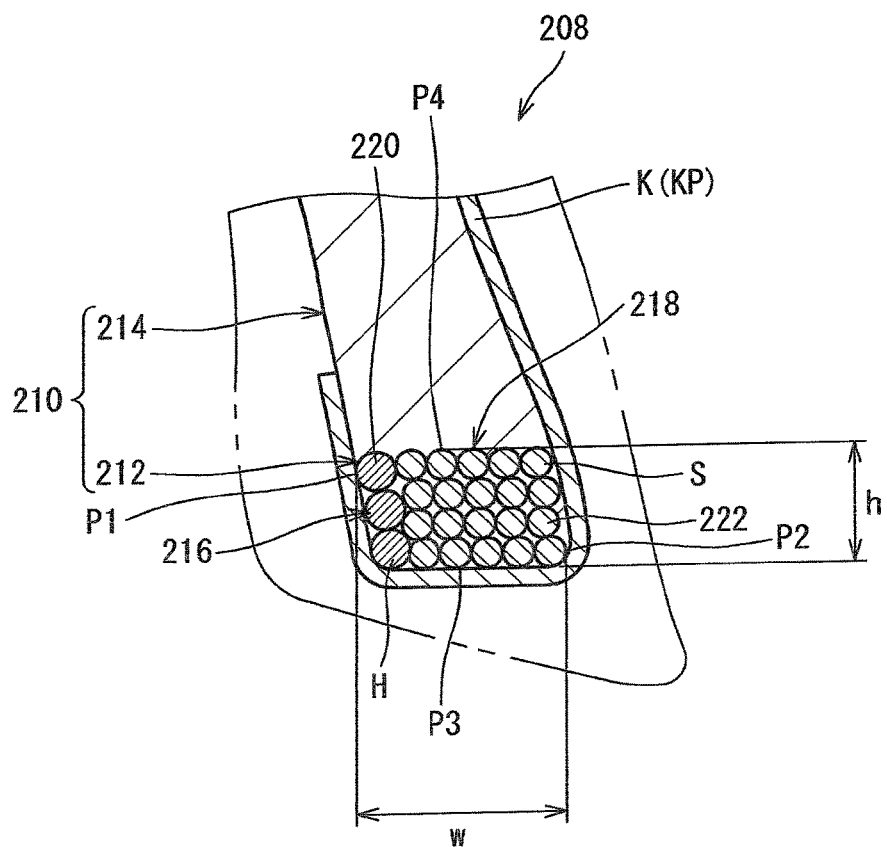
FIG. 12 is an enlarged cross-sectional view showing a portion of a pneumatic tire according to still another embodiment of the present invention.

FIG. 12 shows a portion of a pneumatic tire 208 according to sill another embodiment of the present invention. FIG. 12 shows a bead 210 portion of the tire 208. In FIG. 12, the up-down direction is the radial direction of the tire 208, the right-left direction is the axial direction of the tire 208, and the direction perpendicular to the surface of the sheet is the circumferential direction of the tire 208. FIG. 12 shows a portion of a cross-section of the tire 208 along the radial direction. In FIG. 12, the right side of the surface of the sheet is the inner side in the axial direction, and the left side of the surface of the sheet is the outer side in the axial direction.

In the tire 208, the configuration except for the beads 210 is the same as that of the tire 142 shown in FIG. 8. The configuration except for the beads 210 is also the same as that of the tire 22 shown in FIG. 1. The tire 208 includes, in addition to the beads 210, a tread, sidewalls, clinches, a carcass, a belt, a band, an inner liner, wings, and cushion layers.

Each bead 210 has a ring shape. Each bead 210 includes a core 212 and an apex 214. The apex 214 extends from the core 212 outward in the radial direction. The apex 214 is tapered outward in the radial direction. The apex 214 is formed from a highly hard crosslinked rubber. In the drawing, reference character K indicates the carcass, and reference character KP indicates a carcass ply that forms the carcass K. The carcass ply KP is turned up around the core 212 from the inner side to the outer side in the axial direction.

The core 212 includes a hard unit 216 and a soft unit 218. The core 212 of the tire 208 is composed of the hard unit 216 and the soft unit 218.

The hard unit 216 forms an outer portion of the core 212 in the axial direction. The hard unit 216 includes a hard cord 220 extending in the circumferential direction. When the tire 208 is fitted on a rim, the hard unit 216 serves to tighten the tire 208 on the rim.

In the tire 208, the hard unit 216 is formed by winding the hard cord 220 in the circumferential direction a plurality of times. Accordingly, the hard unit 216 is obtained in which cross-sections of the hard cord 220 are arranged in the axial direction and the radial direction. As shown in the drawing, the number of the cross-sections of the hard cord 220 included in a cross-section of the hard unit 216 is three. The hard unit 216 of the tire 208 is formed by helically winding the hard cord 220 in the circumferential direction three times. The hard unit 216 may be formed by winding, in the circumferential direction, a bundle composed of a plurality of hard cords 220.

In the tire 208, the material of the hard cord 220 is preferably steel. The hard cord 220 is difficult to stretch as compared to one formed from an organic fiber. The hard cord 220 can contribute to tightening the tire 208 on the rim.

In the tire 208, as the hard cord 220, one formed of the single element wire as shown in FIG. 3 is preferable. The hard cord 220 is difficult to stretch as compared to one formed of a plurality of element wires. The hard cord 220 can contribute to tightening the tire 208 on the rim.

In the tire 208, preferably, the material of the hard cord 220 is steel, and the hard cord 220 is formed of an element wire. The stretch of the hard cord 220 is small. In other words, the hard cord 220 is non-stretchable. The non-stretchable hard cord 220 can effectively contribute to tightening the tire 208 on the rim. The hard unit 216 composed of the non-stretchable hard cord 220 can firmly tighten the tire 208 on the rim.

In the tire 208, one cross-section (reference character H in FIG. 12) of the hard cord 220 is located at a portion, at the outer side in the axial direction and at the inner side in the radial direction, of a cross-section of the core 212. As described above, the hard cord 220 is non-stretchable. The core 212 configured such that the hard cord 220 is located at the portion at the outer side in the axial direction and at the inner side in the radial direction can more firmly tighten the tire 208 on the rim.

In the tire 208, the hard cord 220 only needs to be non-stretchable, and is not limited to the element wire of which the material is steel. One formed from an organic fiber, a glass fiber, or a carbon fiber may be used as the hard cord 220, or one formed from a plurality of element wires may be used as the hard cord 220, as long as it is non-stretchable. Examples of the organic fiber include nylon fibers, polyethylene terephthalate fibers, rayon fibers, polyethylene naphthalate fibers, and aramid fibers.

In the tire 208, in light of tightening force, the outer diameter dh of the hard cord 220 is preferably equal to or greater than 0.5 mm. In light of weight reduction, the outer diameter dh of the hard cord 220 is preferably equal to or less than 10 mm.

The soft unit 218 is located inward of the hard unit 216 in the axial direction. The soft unit 218 includes a soft cord 222 extending in the circumferential direction. When the tire 208 is fitted on the rim, the soft unit 218 serves to tighten the tire 208 on the rim.

In the tire 208, the soft unit 218 is formed by winding the soft cord 222 in the circumferential direction a plurality of times. Accordingly, the soft unit 218 is obtained in which cross-sections of the soft cord 222 are arranged in the axial direction and the radial direction. As shown in the drawing, the number of the cross-sections of the soft cord 222 included in a cross-section of the soft unit 218 is 20. The soft unit 218 of the tire 208 is formed by helically winding the soft cord 222 in the circumferential direction 20 times. The soft unit 218 may be formed by winding, in the circumferential direction, a bundle composed of a plurality of soft cords 222.

The soft cord 222 stretches more easily than the above-described hard cord 220. The elongation of the soft cord 222 is greater than the elongation of the hard cord 220. Thus, when the tire 208 is fitted onto the rim, the soft unit 218 composed of the soft cord 222 does not inhibit deformation of the core 212. Since the core 212 easily deforms, the bead 210 portion of the tire 208 easily passes over a hump of the rim. According to the present invention, the tire 208 can be fitted onto the rim at a low fitting pressure. Fitting the tire 208 onto the rim is easy.

In the tire 208, one cross-section (reference character S in FIG. 12) of the soft cord 222 is located at a portion, at the inner side in the axial direction and at the outer side in the radial direction, of the cross-section of the core 212. This portion corresponds to the portion in the core 8 of the conventional tire 2 to which portion great tension is applied when the tire 2 is fitted onto the rim. Since the soft cord 222 stretches more easily than the hard cord 220, the soft cord 222 located at the portion, at the inner side in the axial direction and at the outer side in the radial direction, of the cross-section of the core 212 can effectively contribute to deformation of the core 212. Since the bead 210 portion of the tire 208 easily passes over the hump of the rim, the tire 208 can be fitted onto the rim at a low fitting pressure. In addition, due to a synergistic effect of the hard unit 216 and the soft unit 218, the core 212 can more firmly tighten the tire 208 on the rim. With the tire 208, a low fitting pressure is achieved without impairing the tightening force.

Examples of the soft cord 222 in the tire 208 include those having the configurations shown in (a) to (d) of FIG. 5 described above. The soft cord 222 only needs to have an elongation greater than the elongation of the hard cord 220, and is not limited to one formed by twisting together a plurality of element wires of each of which the material is steel. A raw yarn formed from an organic fiber, a glass fiber, or a carbon fiber may be used as the soft cord 222, or one formed by twisting together a plurality of the raw yarns may be used as the soft cord 222, as long as it stretches more easily than the hard cord 220. Examples of the organic fiber include nylon fibers, polyethylene terephthalate fibers, rayon fibers, polyethylene naphthalate fibers, and aramid fibers. In light of weight reduction of the tire 208, the soft cord 222 is preferably one formed from an organic fiber.

In the tire 208, in light of tightening force, the outer diameter ds of the soft cord 222 is preferably equal to or greater than 0.5 mm. In light of weight reduction, the outer diameter ds of the soft cord 222 is preferably equal to or less than 30 mm.

In the tire 208, particularly, the one cross-section H of the hard cord 220 is located at the portion, at the outer side in the axial direction and at the inner side in the radial direction, of the cross-section of the core 212, and the one cross-section S of the soft cord 222 is located at the portion, at the inner side in the axial direction and at the outer side in the radial direction, of the cross-section of the core 212. The core 212 in which the hard cord 220 and the soft cord 222 are located as described above can effectively contribute to maintenance of the tightening force and reduction of the fitting pressure. As described later, in the tire 208, an elongation EH at specific load (hereinafter, elongation EH) of the hard cord 220 and an elongation ES at specific load (hereinafter, elongation ES) of the soft cord 222 are appropriately adjusted. Therefore, with the tire 208, a low fitting pressure can be achieved without impairing the tightening force.

The elongation EH of the hard cord 220 and the elongation ES of the soft cord 222 influence the tightening force and the fitting pressure. In the tire 208, in light of reduction of the fitting pressure, the ratio of the elongation ES relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 208, the width (a double-headed arrow w in FIG. 12) of the core 212 in the axial direction is equal to or greater than 1 mm and equal to or less than 50 mm. The height (a double-headed arrow h in FIG. 12) of the core 212 in the radial direction is equal to or greater than 1 mm and equal to or less than 50 mm. The width w is represented by the length in the axial direction from the outer edge (reference character P1 in FIG. 12) of the core 212 in the axial direction to the inner edge (reference character P2 in FIG. 12) of the core 212 in the axial direction. The height h is represented by the length in the radial direction from the inner edge (reference character P3 in FIG. 12) of the core 212 in the radial direction to the outer edge (reference character P4 in FIG. 12) of the core 212 in the radial direction.

In the tire 208, the ratio of the total sum HA of the areas of the cross-sections of the hard cord 220 included in the cross-section of the hard unit 216 of the core 212, relative to the area BA of the cross-section of the core 212, is preferably equal to or greater than 20% and equal to or less than 95%. When this ratio is set so as to be equal to or greater than 20%, an appropriate tightening force is obtained. When this ratio is set so as to be equal to or less than 95%, weight reduction and a low fitting pressure are achieved. The area BA of the cross-section of the core 212 is represented by the product of the above-described width w in the axial direction and the above-described height h in the radial direction.

In the tire 208, the ratio of the total sum SA of the areas of the cross-sections of the soft cord 222 included in the cross-section of the soft unit 218, relative to the area BA of the cross-section of the core 212, is preferably equal to or greater than 5% and equal to or less than 80%. When this ratio is set so as to be equal to or greater than 5%, an appropriate tightening force is obtained. When this ratio is set so as to be equal to or less than 80%, weight reduction and a low fitting pressure are achieved.

Figure 13:
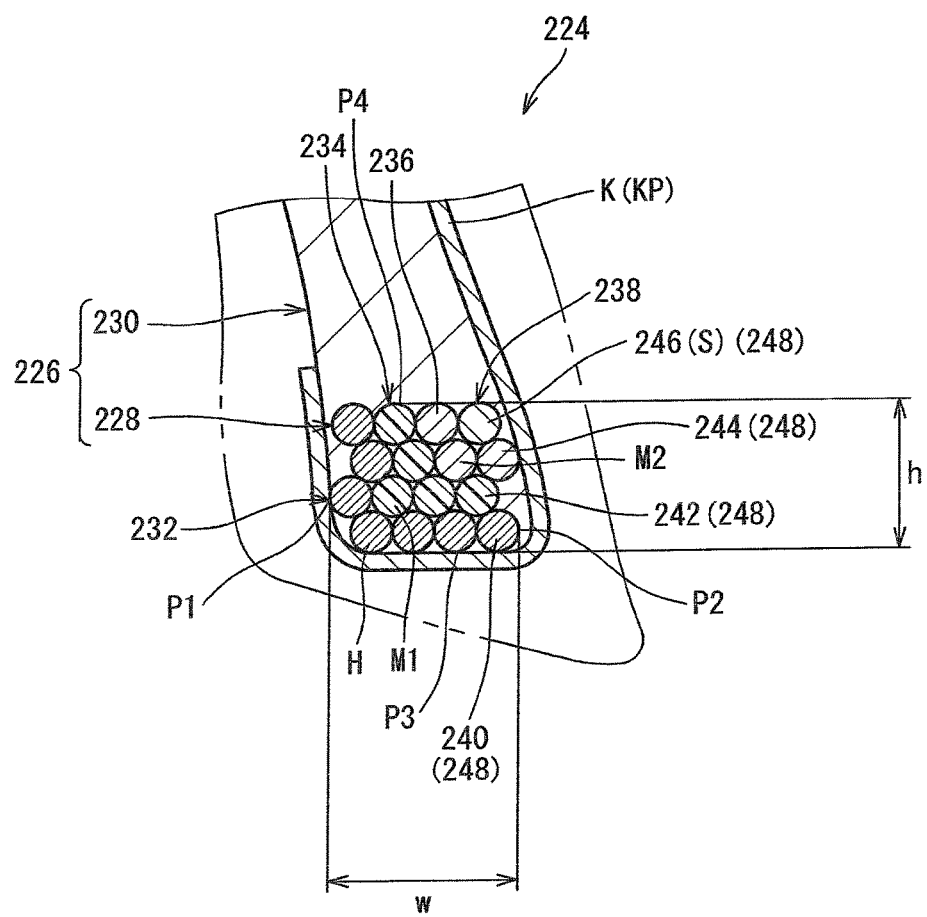
FIG. 13 is an enlarged cross-sectional view showing a portion of a pneumatic tire according to still another embodiment of the present invention.

FIG. 13 shows a portion of a pneumatic tire 224 according to sill another embodiment of the present invention. FIG. 13 shows a bead 226 portion of the tire 224. In FIG. 13, the up-down direction is the radial direction of the tire 224, the right-left direction is the axial direction of the tire 224, and the direction perpendicular to the surface of the sheet is the circumferential direction of the tire 224. FIG. 13 shows a portion of a cross-section of the tire 224 along the radial direction. In FIG. 13, the right side of the surface of the sheet is the inner side in the axial direction, and the left side of the surface of the sheet is the outer side in the axial direction.

In the tire 224, the configuration except for the beads 226 is the same as that of the tire 142 shown in FIG. 8. The configuration except for the beads 226 is also the same as that of the tire 22 shown in FIG. 1. The tire 224 includes, in addition to the beads 226, a tread, sidewalls, clinches, a carcass, a belt, a band, an inner liner, wings, and cushion layers.

Each bead 226 has a ring shape. Each bead 226 includes a core 228 and an apex 230. The apex 230 extends from the core 228 outward in the radial direction. The apex 230 is tapered outward in the radial direction. The apex 230 is formed from a highly hard crosslinked rubber. In the drawing, reference character K indicates the carcass, and reference character KP indicates a carcass ply that forms the carcass K. The carcass ply KP is turned up around the core 228 from the inner side to the outer side in the axial direction.

The core 228 includes a hard unit 232, a first middle unit 234, a second middle unit 236, and a soft unit 238. The core 228 of the tire 224 is composed of the hard unit 232, the first middle unit 234, the second middle unit 236, and the soft unit 238.

The hard unit 232 forms an inner portion of the core 228 in the radial direction and an outer portion of the core 228 in the axial direction. The hard unit 232 includes a hard cord 240 extending in the circumferential direction. When the tire 224 is fitted on a rim, the hard unit 232 serves to tighten the tire 224 on the rim.

In the tire 224, the hard unit 232 is formed by winding the hard cord 240 in the circumferential direction a plurality of times. Accordingly, the hard unit 232 is obtained in which cross-sections of the hard cord 240 are arranged in the axial direction and the radial direction. As shown in the drawing, the number of the cross-sections of the hard cord 240 included in a cross-section of the hard unit 232 is seven. The hard unit 232 of the tire 224 is formed by helically winding the hard cord 240 in the circumferential direction seven times. The hard unit 232 may be formed by winding, in the circumferential direction, a bundle composed of a plurality of hard cords 240.

In the tire 224, the material of the hard cord 240 is preferably steel. The hard cord 240 is difficult to stretch as compared to one formed from an organic fiber. The hard cord 240 can contribute to tightening the tire 224 on the rim.

In the tire 224, as the hard cord 240, one formed of the single element wire as shown in FIG. 3 is preferable. The hard cord 240 is difficult to stretch as compared to one formed of a plurality of element wires. The hard cord 240 can contribute to tightening the tire 224 on the rim.

In the tire 224, preferably, the material of the hard cord 240 is steel, and the hard cord 240 is formed of an element wire. The stretch of the hard cord 240 is small. In other words, the hard cord 240 is non-stretchable. The non-stretchable hard cord 240 can effectively contribute to tightening the tire 224 on the rim. The hard unit 232 composed of the non-stretchable hard cord 240 can firmly tighten the tire 224 on the rim.

In the tire 224, one cross-section (reference character H in FIG. 13) of the hard cord 240 is located at a portion, at the outer side in the axial direction and at the inner side in the radial direction, of a cross-section of the core 228. As described above, the hard cord 240 is non-stretchable. The core 228 configured such that the hard cord 240 is located at the portion at the outer side in the axial direction and at the inner side in the radial direction can more firmly tighten the tire 224 on the rim.

In the tire 224, the hard cord 240 only needs to be non-stretchable, and is not limited to the element wire of which the material is steel. One formed from an organic fiber, a glass fiber, or a carbon fiber may be used as the hard cord 240, or one formed from a plurality of element wires may be used as the hard cord 240, as long as it is non-stretchable. Examples of the organic fiber include nylon fibers, polyethylene terephthalate fibers, rayon fibers, polyethylene naphthalate fibers, and aramid fibers.

In the tire 224, in light of tightening force, the outer diameter dh of the hard cord 240 is preferably equal to or greater than 0.5 mm. In light of weight reduction, the outer diameter dh of the hard cord 240 is preferably equal to or less than 10 mm.

The first middle unit 234 is located outward of the hard unit 232 in the radial direction. The first middle unit 234 is located inward of the hard unit 232 in the axial direction. The first middle unit 234 is located between the hard unit 232 and the second middle unit 236. The first middle unit 234 includes a first middle cord 242 extending in the circumferential direction. When the tire 224 is fitted on the rim, the first middle unit 234 serves to tighten the tire 224 on the rim.

In the tire 224, the first middle unit 234 is formed by winding the first middle cord 242 in the circumferential direction a plurality of times. Accordingly, the first middle unit 234 is obtained in which cross-sections of the first middle cord 242 are arranged in the axial direction and the radial direction. As shown in the drawing, the number of the cross-sections of the first middle cord 242 included in a cross-section of the first middle unit 234 is five. The first middle unit 234 of the tire 224 is formed by helically winding the first middle cord 242 in the circumferential direction five times. The first middle unit 234 may be formed by winding, in the circumferential direction, a bundle composed of a plurality of first middle cords 242.

The first middle cord 242 stretches more easily than the above-described hard cord 240. The elongation of the first middle cord 242 is greater than the elongation of the hard cord 240. Thus, when the tire 224 is fitted onto the rim, the first middle unit 234 composed of the first middle cord 242 does not inhibit deformation of the core 228. Since the core 228 easily deforms, the bead 226 portion of the tire 224 easily passes over a hump of the rim. According to the present invention, the tire 224 can be fitted onto the rim at a low fitting pressure. Fitting the tire 224 onto the rim is easy.

Examples of the first middle cord 242 in the tire 224 include those having the configurations shown in (a) to (d) of FIG. 5 described above. The first middle cord 242 only needs to have an elongation greater than the elongation of the hard cord 240, and is not limited to one formed by twisting together a plurality of element wires of each of which the material is steel. A raw yarn formed from an organic fiber, a glass fiber, or a carbon fiber may be used as the first middle cord 242, or one formed by twisting together a plurality of the raw yarns may be used as the first middle cord 242, as long as it stretches more easily than the hard cord 240. Examples of the organic fiber include nylon fibers, polyethylene terephthalate fibers, rayon fibers, polyethylene naphthalate fibers, and aramid fibers. In light of weight reduction of the tire 224, the first middle cord 242 is preferably one formed from an organic fiber.

In the tire 224, in light of tightening force, the outer diameter dm1 of the first middle cord 242 is preferably equal to or greater than 0.5 mm. In light of weight reduction, the outer diameter dm1 of the first middle cord 242 is preferably equal to or less than 30 mm.

The second middle unit 236 is located outward of the first middle unit 234 in the radial direction. The second middle unit 236 is located inward of the first middle unit 234 in the axial direction. The second middle unit 236 is located between the first middle unit 234 and the soft unit 238. The second middle unit 236 includes a second middle cord 244 extending in the circumferential direction. When the tire 224 is fitted on the rim, the second middle unit 236 serves to tighten the tire 224 on the rim.

In the tire 224, the second middle unit 236 is formed by winding the second middle cord 244 in the circumferential direction a plurality of times. Accordingly, the second middle unit 236 is obtained in which cross-sections of the second middle cord 244 are arranged in the axial direction and the radial direction. As shown in the drawing, the number of the cross-sections of the second middle cord 244 included in a cross-section of the second middle unit 236 is three. The second middle unit 236 of the tire 224 is formed by helically winding the second middle cord 244 in the circumferential direction three times. The second middle unit 236 may be formed by winding, in the circumferential direction, a bundle composed of three second middle cords 244.

The second middle cord 244 stretches more easily than the above-described first middle cord 242. The elongation of the second middle cord 244 is greater than the elongation of the first middle cord 242. Thus, when the tire 224 is fitted onto the rim, the second middle unit 236 composed of the second middle cord 244 does not inhibit deformation of the core 228. Since the core 228 easily deforms, the bead 226 portion of the tire 224 easily passes over the hump of the rim. According to the present invention, the tire 224 can be fitted onto the rim at a low fitting pressure. Fitting the tire 224 onto the rim is easy.

Examples of the second middle cord 244 in the tire 224 include those having the configurations shown in (a) to (d) of FIG. 5 described above. The second middle cord 244 only needs to have an elongation greater than the elongation of the first middle cord 242, and is not limited to one formed by twisting together a plurality of element wires of each of which the material is steel. A raw yarn formed from an organic fiber, a glass fiber, or a carbon fiber may be used as the second middle cord 244, or one formed by twisting together a plurality of the raw yarns may be used as the second middle cord 244, as long as it stretches more easily than the first middle cord 242. Examples of the organic fiber include nylon fibers, polyethylene terephthalate fibers, rayon fibers, polyethylene naphthalate fibers, and aramid fibers. In light of weight reduction of the tire 224, the second middle cord 244 is preferably one formed from an organic fiber.

In the tire 224, in light of tightening force, the outer diameter dm2 of the second middle cord 244 is preferably equal to or greater than 0.5 mm. In light of weight reduction, the outer diameter dm2 of the second middle cord 244 is preferably equal to or less than 30 mm.

The soft unit 238 is located outward of the second middle unit 236 in the radial direction. The soft unit 238 is located inward of the second middle unit 236 in the axial direction. The soft unit 238 forms a portion, at the outer side in the radial direction and at the inner side in the axial direction, of the core 228. The soft unit 238 includes a soft cord 246 extending in the circumferential direction. When the tire 224 is fitted on the rim, the soft unit 238 serves to tighten the tire 224 on the rim.

As shown in the drawing, the number of cross-sections of the soft cord 246 included in a cross-section of the soft unit 238 is one. In the tire 224, the soft unit 238 is formed by winding the soft cord 246 in the circumferential direction once. The soft unit 238 may be formed by winding the soft cord 246 in the circumferential direction a plurality of times. The soft unit 238 may be formed by winding, in the circumferential direction, a bundle composed of a plurality of soft cords 246.

The soft cord 246 stretches more easily than the above-described second middle cord 244. The elongation of the soft cord 246 is greater than the elongation of the second middle cord 244. Thus, when the tire 224 is fitted onto the rim, the soft unit 238 composed of the soft cord 246 does not inhibit deformation of the core 228. Since the core 228 easily deforms, the bead 226 portion of the tire 224 easily passes over the hump of the rim. According to the present invention, the tire 224 can be fitted onto the rim at a low fitting pressure. Fitting the tire 224 onto the rim is easy.

In the tire 224, one cross-section (reference character S in FIG. 13) of the soft cord 246 is located at a portion, at the inner side in the axial direction and at the outer side in the radial direction, of the cross-section of the core 228. This portion corresponds to the portion in the core 8 of the conventional tire 2 to which portion great tension is applied when the tire 2 is fitted onto the rim. As described above, the soft cord 246 stretches more easily than the second middle cord 244. The second middle cord 244 stretches more easily than the first middle cord 242. The first middle cord 242 stretches more easily than the hard cord 240. Therefore, the soft cord 246 stretches more easily than the hard cord 240. Accordingly, the soft cord 246 located at the portion, at the inner side in the axial direction and at the outer side in the radial direction, of the cross-section of the core 228 can effectively contribute to deformation of the core 228. Since the bead 226 portion of the tire 224 easily passes over the hump of the rim, the tire 224 can be fitted onto the rim at a low fitting pressure. In addition, due to a synergistic effect of the hard unit 232, the first middle unit 234, the second middle unit 236, and the soft unit 238, the core 228 can more firmly tighten the tire 224 on the rim. With the tire 224, a low fitting pressure is achieved without impairing the tightening force.

Examples of the soft cord 246 in the tire 224 include those having the configurations shown in (a) to (d) of FIG. 5 described above. The soft cord 246 only needs to have an elongation greater than the elongation of the second middle cord 244, and is not limited to one formed by twisting together a plurality of element wires of each of which the material is steel. A raw yarn formed from an organic fiber, a glass fiber, or a carbon fiber may be used as the soft cord 246, or one formed by twisting together a plurality of the raw yarns may be used as the soft cord 246, as long as it stretches more easily than the second middle cord 244. Examples of the organic fiber include nylon fibers, polyethylene terephthalate fibers, rayon fibers, polyethylene naphthalate fibers, and aramid fibers. In light of weight reduction of the tire 224, the soft cord 246 is preferably one formed from an organic fiber.

In the tire 224, in light of tightening force, the outer diameter ds of the soft cord 246 is preferably equal to or greater than 0.5 mm. In light of weight reduction, the outer diameter ds of the soft cord 246 is preferably equal to or less than 30 mm.

In the tire 224, particularly, the one cross-section H of the hard cord 240 is located at the portion, at the outer side in the axial direction and at the inner side in the radial direction, of the cross-section of the core 228, and the one cross-section S of the soft cord 246 is located at the portion, at the inner side in the axial direction and at the outer side in the radial direction, of the cross-section of the core 228. The core 228 in which the hard cord 240 and the soft cord 246 are located as described above can effectively contribute to maintenance of the tightening force and reduction of the fitting pressure.

In the tire 224, furthermore, in the cross-section of the core 228, one cross-section (reference character M1 in FIG. 13) of the first middle cord 242 is located outward of the one cross-section H of the hard cord 240 in the radial direction and inward of the one cross-section H of the hard cord 240 in the axial direction. One cross-section (reference character M2 in FIG. 13) of the second middle cord 244 is located outward of the one cross-section M1 of the first middle cord 242 in the radial direction and inward of the one cross-section M1 of the first middle cord 242 in the axial direction. The one cross-section S of the soft cord 246 is located outward of the one cross-section M2 of the second middle cord 244 in the radial direction and inward of the one cross-section M2 of the second middle cord 244 in the axial direction. The core 228 of the tire 224 is configured such that the elongation of a cord 248 that forms the core 228 gradually increases from a portion at the outer side in the axial direction and at the inner side in the radial direction toward a portion at the inner side in the axial direction and at the outer side in the radial direction. The core 228 can effectively contribute to maintenance of the tightening force and reduction of the fitting pressure. With the tire 224, a low fitting pressure can be achieved without impairing the tightening force.

An elongation EH at specific load (hereinafter, elongation EH) of the hard cord 240, an elongation EM1 at specific load (hereinafter, elongation EM1) of the first middle cord 242, an elongation EM2 at specific load (hereinafter, elongation EM2) of the second middle cord 244, and an elongation ES at specific load (hereinafter, elongation ES) of the soft cord 246 influence the tightening force and the fitting pressure.

In the tire 224, in light of reduction of the fitting pressure, the ratio of the elongation ES relative to the elongation EH is preferably equal to or greater than 101%, more preferably equal to or greater than 103%, further preferably equal to or greater than 106%, and particularly preferably equal to or greater than 112%. In light of maintenance of the tightening force, the ratio is preferably equal to or less than 200%.

In the tire 224, in light of reduction of the fitting pressure, the ratio of the elongation EM1 relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 224, in light of reduction of the fitting pressure, the ratio of the elongation EM2 relative to the elongation EH is preferably equal to or greater than 101%, more preferably equal to or greater than 102%, and particularly preferably equal to or greater than 104%. In light of maintenance of the tightening force, the ratio is preferably equal to or less than 200%.

In the tire 224, in light of reduction of the fitting pressure, the ratio of the elongation EM2 relative to the elongation EM1 is preferably equal to or greater than 101%, more preferably equal to or greater than 102%, and particularly preferably equal to or greater than 104%. In light of maintenance of the tightening force, the ratio is preferably equal to or less than 200%.

In the tire 224, in light of reduction of the fitting pressure, the ratio of the elongation ES relative to the elongation EM2 is preferably equal to or greater than 101%, more preferably equal to or greater than 102%, and particularly preferably equal to or greater than 104%. In light of maintenance of the tightening force, the ratio is preferably equal to or less than 200%.

In the tire 224, the width (a double-headed arrow w in FIG. 13) of the core 228 in the axial direction is equal to or greater than 1 mm and equal to or less than 50 mm. The height (a double-headed arrow h in FIG. 13) of the core 228 in the radial direction is equal to or greater than 1 mm and equal to or less than 50 mm. The width w is represented by the length in the axial direction from the outer edge (reference character P1 in FIG. 13) of the core 228 in the axial direction to the inner edge (reference character P2 in FIG. 13) of the core 228 in the axial direction. The height h is represented by the length in the radial direction from the inner edge (reference character P3 in FIG. 13) of the core 228 in the radial direction to the outer edge (reference character P4 in FIG. 13) of the core 228 in the radial direction.

In the tire 224, the ratio of the total sum HA of the areas of the cross-sections of the hard cord 240 included in the cross-section of the hard unit 232 of the core 228, relative to the area BA of the cross-section of the core 228, is preferably equal to or greater than 10% and equal to or less than 95%. When this ratio is set so as to be equal to or greater than 10%, an appropriate tightening force is obtained. When this ratio is set so as to be equal to or less than 95%, weight reduction and a low fitting pressure are achieved. The area BA of the cross-section of the core 228 is represented by the product of the above-described width w in the axial direction and the above-described height h in the radial direction.

In the tire 224, the ratio of the total sum SM1 of the areas of the cross-sections of the first middle cord 242 included in the cross-section of the first middle unit 234, relative to the area BA of the cross-section of the core 228, is preferably equal to or greater than 2% and equal to or less than 80%. When this ratio is set so as to be equal to or greater than 2%, an appropriate tightening force is obtained. When this ratio is set so as to be equal to or less than 80%, weight reduction and a low fitting pressure are achieved.

In the tire 224, the ratio of the total sum SM2 of the areas of the cross-sections of the second middle cord 244 included in the cross-section of the second middle unit 236, relative to the area BA of the cross-section of the core 228, is preferably equal to or greater than 2% and equal to or less than 70%. When this ratio is set so as to be equal to or greater than 2%, an appropriate tightening force is obtained. When this ratio is set so as to be equal to or less than 70%, weight reduction and a low fitting pressure are achieved.

In the tire 224, the ratio of the total sum SA of the areas of the cross-sections of the soft cord 246 included in the cross-section of the soft unit 238, relative to the area BA of the cross-section of the core 228, is preferably equal to or greater than 1% and equal to or less than 60%. When this ratio is set so as to be equal to or greater than 1%, an appropriate tightening force is obtained. When this ratio is set so as to be equal to or less than 60%, weight reduction and a low fitting pressure are achieved.

EXAMPLES

The following will show effects of the present invention by means of examples, but the present invention should not be construed in a limited manner based on the description of these examples.

Example 1

A pneumatic tire (size=195/65R15) of Example 1 having the fundamental structure shown in FIG. 1 and having specifications shown in Table 1 below was obtained. The configuration of the core of each bead of Example 1 is as shown in FIG. 2. In Example 1, a stretchable portion composed of a portion of each apex was provided. In Example 1, a cord of the type shown in FIG. 3 was used for forming the main body of the core. The material of the cord was steel. The outer diameter dh of the cord was set to 1.2 mm. In Example 1, the width w of the core in the axial direction was set to 8 mm, and the height h of the core in the radial direction was set to 5 mm.

Examples 2 to 4

Pneumatic tires of Examples 2 to 4 were obtained in the same manner as Example 1, except the configuration of each bead was as shown in Table 1 below. In Examples 2 to 4, a cord that is the same as the cord used in Example 1 was used for forming the hard unit.

In Example 2, a soft cord of the type shown in (d) of FIG. 5 was used for forming the soft unit. The material of the soft cord was steel. The outer diameter ds of the soft cord was set to 1.6 mm. The soft cord is one formed by twisting together four element wires (wire diameter=0.6 mm). Each element wire is reformed in a wavy shape in which a height represented by the amplitude from a crest of the element wire to a trough of the element wire is 1 mm and a pitch represented by the length from one crest to another crest adjacent to this crest is 10 mm. In Example 2, the width w of the core in the axial direction was set to 8 mm, and the height h of the core in the radial direction was set to 8 mm.

In Example 3, a soft cord of the type shown in (a) of FIG. 5 was used for forming the soft unit. The soft cord is formed from an aramid fiber. The outer diameter ds of the soft cord was set to 1 mm. The soft cord is one formed by twisting together three raw yarns (configuration=1670 dtex/2). In Example 3, the width w of the core in the axial direction was set to 8 mm, and the height h of the core in the radial direction was set to 8 mm.

In Example 4, a middle cord of the type shown in (c) of FIG. 5 was used for forming the middle unit. The material of the middle cord was steel. The outer diameter dm of the middle cord was set to 1 mm. The middle cord is one formed by twisting together four element wires (wire diameter=0.5 mm). Each element wire is not reformed in a wavy shape. A soft cord of the type shown in (b) of FIG. 5 was used for forming the soft unit. The material of the soft cord was steel. The outer diameter ds of the soft cord was set to 1 mm. The soft cord is one formed by twisting together three element wires (wire diameter=0.5 mm). Each element wire is reformed in a wavy shape in which a height represented by the amplitude from a crest of the element wire to a trough of the element wire is 1 mm and a pitch represented by the length from one crest to another crest adjacent to this crest is 10 mm. In Example 4, the width w of the core in the axial direction was set to 8 mm, and the height h of the core in the radial direction was set o 8 mm.

Example 5

A pneumatic tire (size=195/65R15) of Example 5 having the fundamental structure shown in FIG. 8 and having specifications shown in Table 2 below was obtained. The configuration of the core of each bead of Example 5 is as shown in FIG. 9. In Example 5, no stretchable portion is provided. In Example 5, a cord that is the same as the hard cord used in Example 1 was used as the hard cord for forming the hard unit. A soft cord of the type shown in (a) of FIG. 5 was used for forming the soft unit. The soft cord is formed from an aramid fiber. The outer diameter DMa of the soft cord was set to 3 mm. The soft cord is one formed by twisting together three raw yarns (configuration=1500 dtex/2). In Example 5, the width w of the core in the axial direction was set to 8 mm, and the height h of the core in the radial direction was set to 14 mm.

Examples 6 to 9

Pneumatic tires of Examples 6 to 9 were obtained in the same manner as Example 5, except the configuration of each bead was as shown in Table 2 below. In Examples 6 to 9, a cord that is the same as the cord used in Example 5 was used as the hard cord for forming the hard unit.

In Example 6, a cord that is the same as the soft cord used in Example 5 was used as the soft cord for forming the soft unit. In Example 6, the width w of the core in the axial direction was set to 8 mm, and the height h of the core in the radial direction was set to 10 mm.

In Example 7, a soft cord of the type shown in (c) of FIG. 5 was used for forming the soft unit. The soft cord is formed from an aramid fiber. The outer diameter ds of the soft cord was set to 4 mm. The soft cord is one formed by twisting together four raw yarns (configuration=1500 dtex/2). In Example 7, the width w of the core in the axial direction was set to 8 mm, and the height h of the core in the radial direction was set to 8 mm.

In Example 8, a cord that is the same as the soft cord used in Example 2 was used as the soft cord for forming the soft unit. In Example 8, the width w of the core in the axial direction was set to 8 mm, and the height h of the core in the radial direction was set to 8 mm.

In Example 9, a cord that is the same as the middle cord used in Example 4 was used as the first middle cord for forming the first middle unit. A second middle cord of the type shown in (a) of FIG. 5 was used for forming the second middle unit. The material of the second middle cord was steel. The outer diameter dm2 of the second middle cord was set to 1.1 mm. The second middle cord is one formed by twisting together three element wires (wire diameter=0.3 mm). Each element wire is not reformed in a wavy shape. A cord that is the same as the soft cord used in Example 4 was used as the soft cord for forming the soft unit. In Example 9, the width w of the core in the axial direction was set to 8 mm, and the height h of the core in the radial direction was set to 8 mm.

Comparative Example 1

Figure 14:
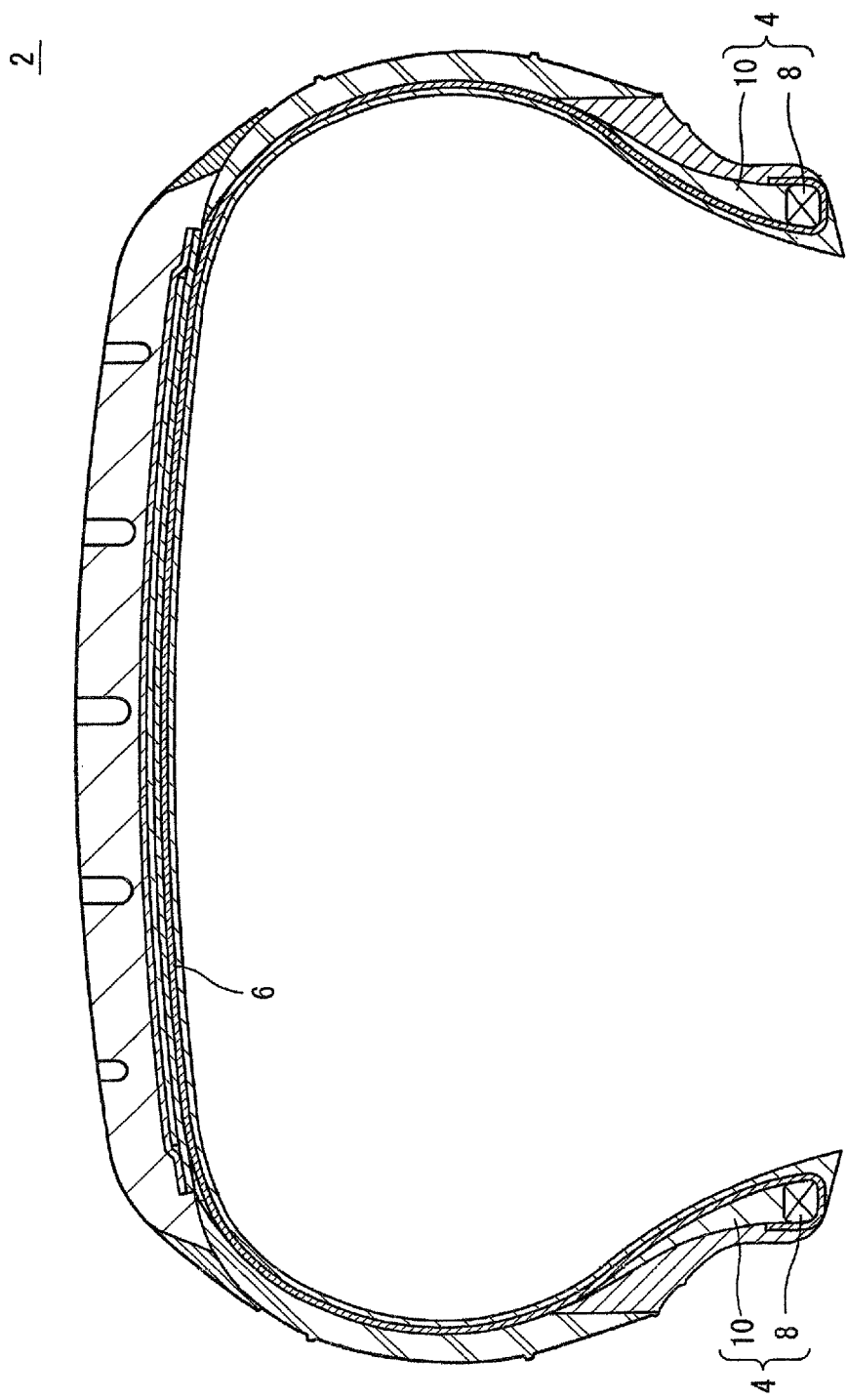
FIG. 14 is a cross-sectional view showing a conventional pneumatic tire.
Figure 15:
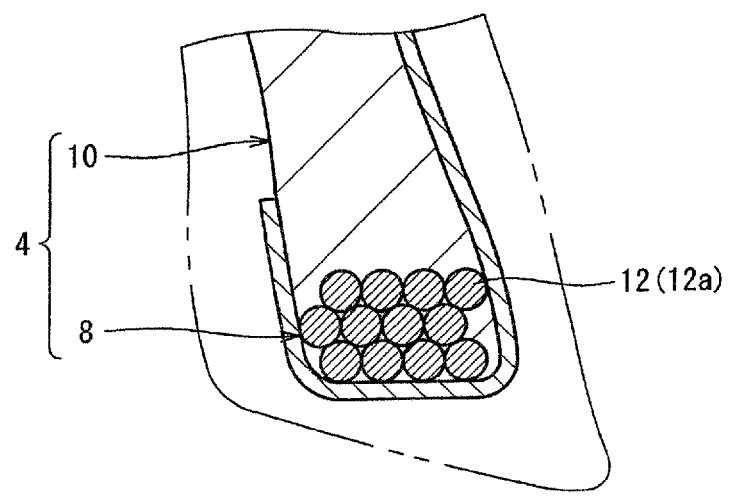
FIG. 15 is an enlarged cross-sectional view showing a portion of the tire in FIG. 14.
Figure 16:
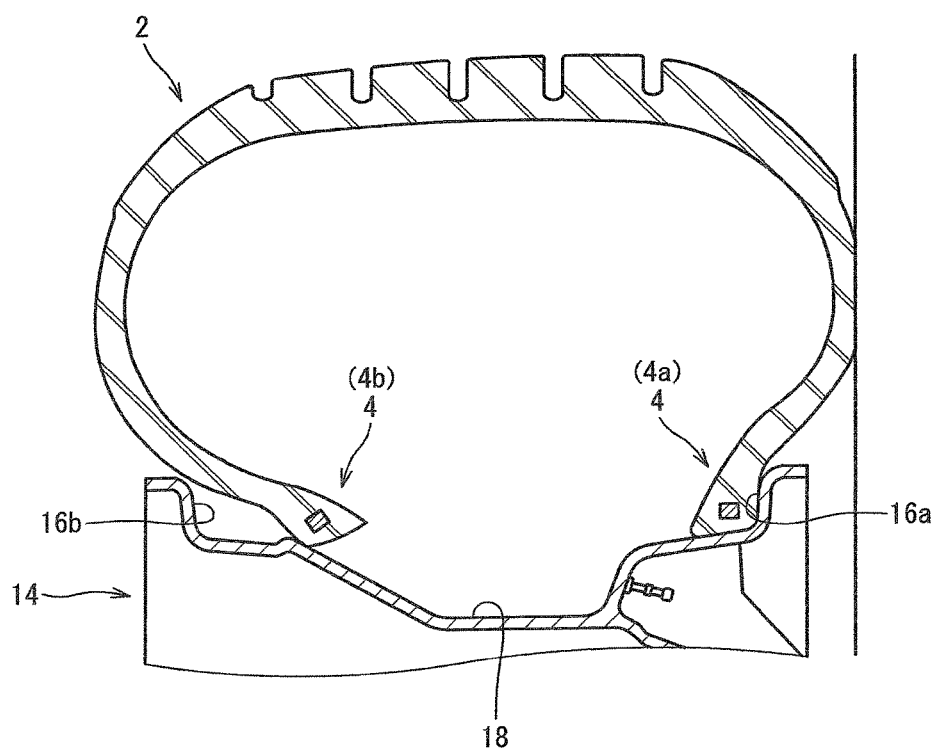
FIG. 16 is a cross-sectional view showing a state where the tire in FIG. 14 is fitted onto a rim.
Figure 17:
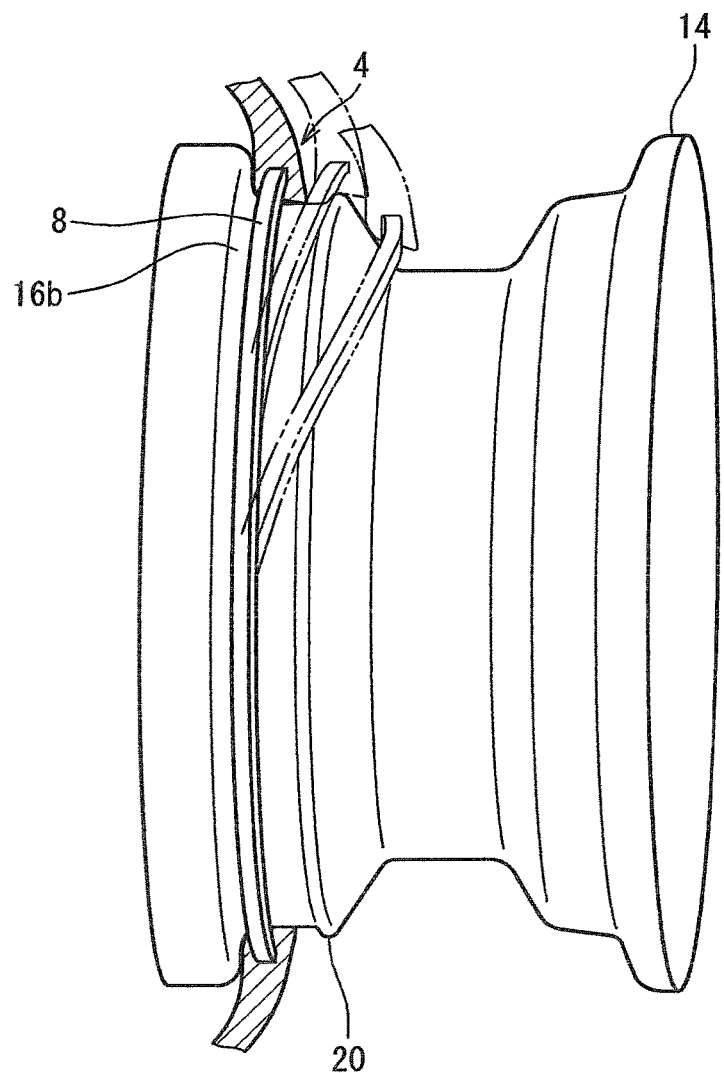
FIG. 17 is a schematic diagram showing movement of a cord when the tire is fitted onto the rim.

A pneumatic tire (size=195/65R15) of Comparative Example 1 having the fundamental structure shown in FIG. 14 and having specifications shown in Table 1 below was obtained. The configuration of the core of each bead of Comparative Example 1 is as shown in FIG. 15. In Comparative Example 1, no stretchable portion is provided. Comparative Example 1 is a conventional tire. In Comparative Example 1, a cord of the type shown in FIG. 3 was used for forming the core. The material of the cord was steel. The outer diameter of the cord was set to 1.2 mm. The cord is the same as the cord in Example 1.

[Elongation]

For the cord used for forming the core, an elongation at specific load was measured. The results are shown, in Tables 1 and 2 below, as indexes with the elongation of the cord of Comparative Example 1 defined as 100. It is represented that the higher the value is, the more easily the cord stretches. When the core includes a plurality of types of cords, since the cord that is the same as the cord in Comparative Example 1 is used as the hard cord, the values indicated as the elongation of the middle cord, and the soft cord, etc. are also ratios relative to the elongation of the hard cord.

[Weight Reduction Index]

In Examples 1 to 4, the weight of the main body of the core was measured. In Examples 5 to 9 and Comparative Example 1, the weight of the core was measured. The results are shown, in Tables 1 and 2 below, as indexes with the weight of Comparative Example 1 defined as 100. The lower the value is, the better the result is.

[Fitting Pressure]

Each tire was mounted onto a rim (size=15×6J) and inflated with air, and a pressure (fitting pressure) was measured when the bead portion of the tire passed over a hump of the rim. The results are shown in Tables 1 and 2 below. The lower the value is, the better the result is. In the measurement of the fitting pressure, the supply pressure of air was adjusted to 500 KPa. A portion of the rim onto which portion the tire was fitted was cleaned to remove dirt. A lubricant (trade name "Mounting Paste" manufactured by TIPTOP JAPAN K.K., or trade name "Tire Cream" manufactured by Japan Seal Rite Co. Ltd.) was applied to the entirety of each bead portion of the tire by using a brush or a sponge. Immediately after the application of the lubricant, the tire was mounted onto the rim and inflated with air, and a fitting pressure was measured. After the measurement, the air is discharged, and the tire was removed from the rim.

TABLE 1

Results of Evaluation

| | Comp. Ex. 1 | Ex. 1 | Ex. 2 | Ex. 3 | Ex. 4 |
|---|---|---|---|---|---|
| Configuration of bead | FIG. 15 | FIG. 2 | FIG. 4 | FIG. 6 | FIG. 7 |
| Stretchable portion | — | Y | Y | Y | Y |
| Cord Number of cross-sections | 12 | 11 | — | — | — |

TABLE 1-continued

Results of Evaluation

|  |  | Comp. Ex. 1 | Ex. 1 | Ex. 2 | Ex. 3 | Ex. 4 |
|---|---|---|---|---|---|---|
| Hard cord | Type | FIG. 3 | FIG. 3 | — | — | — |
|  | Material | Steel | Steel | — | — | — |
|  | Elongation | 100 | 100 | — | — | — |
|  | Number of cross-sections | — | — | 9 | 8 | 4 |
| Middle cord | Type | — | — | FIG. 3 | FIG. 3 | FIG. 3 |
|  | Material | — | — | Steel | Steel | Steel |
|  | Elongation | — | — | 100 | 100 | 100 |
|  | Number of cross-sections | — | — | — | — | 4 |
| Soft cord | Type | — | — | — | — | FIG. 5(c) |
|  | Material | — | — | — | — | Steel |
|  | Elongation | — | — | — | — | 101 |
|  | Number of cross-sections | — | — | 3 | 4 | 3 |
|  | Type | — | — | FIG. 5(d) | FIG. 5(a) | FIG. 5(b) |
|  | Material | — | — | Steel | Aramid | Steel |
|  | Elongation | — | — | 101 | 104 | 102 |
| Weight reduction index |  | 100 | 92 | 100 | 34 | 70 |
| Fitting pressure [kPa] |  | 350 | 300 | 280 | 220 | 260 |

TABLE 2

Results of Evaluation

|  |  | Ex. 5 | Ex. 6 | Ex. 7 | Ex. 8 | Ex. 9 |
|---|---|---|---|---|---|---|
| Configuration of bead | | FIG. 9 | FIG. 10 | FIG. 11 | FIG. 12 | FIG. 13 |
| Stretchable portion | | — | — | — | — | — |
| Hard cord | Number of cross-sections | 4 | 3 | 8 | 10 | 7 |
|  | Type | FIG. 3 | FIG. 3 | FIG. 3 | FIG. 3 | FIG. 3 |
|  | Material | Steel | Steel | Steel | Steel | Steel |
|  | Elongation | 100 | 100 | 100 | 100 | 100 |
| First middle cord | Number of cross-sections | — | — | — | — | 5 |
|  | Type | — | — | — | — | FIG. 5(c) |
|  | Material | — | — | — | — | Steel |
|  | Elongation | — | — | — | — | 101 |
| Second middle cord | Number of cross-sections | — | — | — | — | 3 |
|  | Type | — | — | — | — | FIG. 5(a) |
|  | Material | — | — | — | — | Steel |
|  | Elongation | — | — | — | — | 102 |
| Soft cord | Number of cross-sections | 20 | 20 | 10 | 2 | 1 |
|  | Type | FIG. 5(a) | FIG. 5(a) | FIG. 5(c) | FIG. 5(d) | FIG. 5(b) |
|  | Material | Aramid | Aramid | Aramid | Steel | Steel |
|  | Elongation | 104 | 104 | 102 | 101 | 103 |
| Weight reduction index | | 41 | 34 | 72 | 100 | 100 |
| Fitting pressure [kPa] | | 233 | 192 | 250 | 285 | 266 |

As shown in Tables 1 and 2, the evaluation is higher in the tires of the examples than in the tire of the comparative example. From the results of evaluation, advantages of the present invention are clear.

INDUSTRIAL APPLICABILITY

The method described above is applicable to various pneumatic tires.

DESCRIPTION OF THE REFERENCE CHARACTERS 2, 22, 62, 88, 112, 142, 142, 176, 192, 208, 224 . . . tire
4, 4a, 4b, 30, 64, 90, 114, 150, 178, 194, 210, 226 . . . bead
6, 32, 78, 104, 132, 152 . . . carcass
8, 48, 66, 92, 116, 164, 180, 196, 212, 228 . . . core
10, 50, 68, 94, 118, 166, 182, 198, 214, 230 . . . apex
12, 60, 140, 248 . . . cord
14 . . . rim
16a, 16b . . . flange
18 . . . drop
20 . . . hump
52, 80, 106, 134 . . . carcass ply
52a, 80a, 134a . . . main portion
52b, 134b . . . turned-up portion
56, 70, 96, 120 . . . main body
58, 72, 98, 122 . . . stretchable portion
74, 100, 124, 168, 184, 200, 216, 232 . . . hard unit
76, 102, 130, 172, 188, 204, 220, 240 . . . hard cord
82, 108, 128, 170, 186, 202, 218, 238 . . . soft unit
84, 110, 138, 174, 190, 206, 222, 246 . . . soft cord
86a, 86b, 86c, 86d . . . element wire
126 . . . middle unit
136 . . . middle cord
234 . . . first middle unit
236 . . . second middle unit
242 . . . first middle cord
244 . . . second middle cord

The invention claimed is:

1. A pneumatic tire comprising a pair of ring-shaped beads and a carcass extending on and between one of the beads and the other bead, wherein each bead includes a core and an apex extending from the core outward in a radial direction, each core includes: a main body including a cord extending in a circumferential direction; and a stretchable portion formed from a crosslinked rubber, the stretchable portion is located inward of the main body in an axial direction, and the stretchable portion has a size with which at least one cross-section of the cord can be included therein in a cross-section of the bead; and wherein
each main body includes a hard unit and a soft unit,
the soft unit is located outward of the hard unit in the radial direction,
the hard unit includes a hard cord extending in the circumferential direction,
the soft unit includes a soft cord extending in the circumferential direction,
the soft cord stretches more easily than the hard cord, and
the stretchable portion has a size with which at least one cross-section of the hard cord can be included therein in the cross-section of the bead; and further wherein
each main body further includes a middle unit,
the middle unit is located outward of the hard unit in the radial direction and located outward of the soft unit in the axial direction,
the middle unit includes a middle cord extending in the circumferential direction,
the middle cord stretches more easily than the hard cord,
the soft cord stretches more easily than the middle cord, and
in a cross-section of the main body,
one cross-section of the middle cord is located outward of one cross-section of the hard cord in the radial direction and inward of the one cross-section of the hard cord in the axial direction, and
one cross-section of the soft cord is located outward of the one cross-section of the middle cord in the radial direction and inward of the one cross-section of the middle cord in the axial direction.

2. A pneumatic tire comprising a pair of ring-shaped beads and a carcass extending on and between one of the beads and the other bead, wherein
each bead includes a core and an apex extending from the core outward in a radial direction,
each core includes a hard unit and a soft unit,
the hard unit includes a hard cord extending in a circumferential direction,
the soft unit includes a soft cord extending in the circumferential direction,
the soft cord stretches more easily than the hard cord,
one cross-section of the hard cord is located at a portion, at an outer side in an axial direction and at an inner side in the radial direction, of a cross-section of the core, and
one cross-section of the soft cord is located at a portion, at an inner side in the axial direction and at an outer side in the radial direction, of the cross-section of the core; and wherein
each core further includes a middle unit,
the middle unit is located between the hard unit and the soft unit,
the middle unit includes a middle cord extending in the circumferential direction,
the middle cord stretches more easily than the hard cord,
the soft cord stretches more easily than the middle cord, and
in the cross-section of the core,
one cross-section of the middle cord is located outward of the one cross-section of the hard cord in the radial direction and inward of the one cross-section of the hard cord in the axial direction, and
the one cross-section of the soft cord is located outward of the one cross-section of the middle cord in the radial direction and inward of the one cross-section of the middle cord in the axial direction.

* * * * *